(12) United States Patent
Robinson et al.

(10) Patent No.: US 7,093,553 B2
(45) Date of Patent: Aug. 22, 2006

(54) SUPER HIGH SPEED MULTI-HULL WATERCRAFT

(75) Inventors: Charles W. Robinson, Santa Fe, NM (US); William F. Burns, III, San Diego, CA (US)

(73) Assignee: M Ship Co., LLC., San Diego, CA (US)

( * ) Notice: Subject to any disclaimer, the term of this patent is extended or adjusted under 35 U.S.C. 154(b) by 0 days.

(21) Appl. No.: 11/135,144

(22) Filed: May 23, 2005

(65) Prior Publication Data

US 2006/0075954 A1     Apr. 13, 2006

Related U.S. Application Data

(63) Continuation-in-part of application No. 10/957,914, filed on Oct. 4, 2004, now Pat. No. 6,983,713, which is a continuation-in-part of application No. 10/625,135, filed on Jul. 23, 2003, now Pat. No. 6,868,798.

(51) Int. Cl.
*B63B 1/32* (2006.01)

(52) U.S. Cl. .................. 114/288; 114/291
(58) Field of Classification Search ......... 114/67 A, 114/271, 288, 289, 290, 291; 440/89 R
See application file for complete search history.

(56) References Cited

U.S. PATENT DOCUMENTS

| | | | |
|---|---|---|---|
| 3,094,962 A * | 6/1963 | Harry | 114/271 |
| 3,223,066 A * | 12/1965 | Irving | 114/290 |
| 3,455,267 A | 7/1969 | Tucker | |
| 3,481,297 A * | 12/1969 | Mantle | 114/67 A |
| 3,903,832 A * | 9/1975 | Ishida | 114/289 |
| 4,231,314 A | 11/1980 | Peters | |
| 4,393,802 A | 7/1983 | Rizzo | |
| 4,587,918 A | 5/1986 | Burg | |
| 4,649,851 A | 3/1987 | April | |
| 4,862,817 A * | 9/1989 | Hornsby et al. | 114/67 A |
| 4,926,771 A | 5/1990 | Hull | |
| 4,989,534 A | 2/1991 | Field | |
| 5,415,365 A * | 5/1995 | Ratliff | 114/271 |
| 5,685,253 A | 11/1997 | Alexander, Jr. | |
| 6,250,245 B1 | 6/2001 | Robinson et al. | |
| 6,314,903 B1 | 11/2001 | Robinson et al. | |
| 6,526,903 B1 | 3/2003 | Robinson et al. | |

* cited by examiner

*Primary Examiner*—Lars A. Olson
(74) *Attorney, Agent, or Firm*—Loyal McKinley Hanson

(57) ABSTRACT

A watercraft with at least one onboard propulsion engine includes at least two hulls and a wing-like deck structure spanning the two hulls (a floating wing). Port and starboard skirts combine with the deck structure to form port and starboard planing channels. The deck structure includes an upwardly facing surface that slopes downwardly toward an aft end of the deck structure in order to provide aerodynamic lift. Preferably, a speed-responsive exhaust proportioning system vents exhaust at vertical steps in planing surfaces on the hulls to reduce drag, increase lift, and reduce thermal signature. One embodiment includes hinged laterally extending deck extensions that an operator can raise to reduce vessel breadth during docking, upwardly extending barriers on the deck extensions that reduce the escape of wind laterally, and hinged flap structures disposed rearwardly that enable an operator to adjust vessel trim.

12 Claims, 18 Drawing Sheets

SUPER HIGH SPEED MULTI-HULL WATERCRAFT

CROSS REFERENCE TO RELATED APPLICATIONS

This application is a continuation in part of commonly assigned U.S. patent application Ser. No. 10/957,914 filed Oct. 4, 2004 (the parent application that issued as U.S. Pat. No. 6,983,713 B1 on Jan. 10, 2006), which parent application is a continuation in part of commonly assigned U.S. patent application Ser. No. 10/625,135 filed Jul. 23, 2003 (the grandparent application that issued as U.S. Pat. No. 6,868,798 B2 on Mar. 22, 2005).

BACKGROUND OF THE INVENTION

1. Technical Field

This invention relates generally to powered watercraft, and more particularly to a super high speed watercraft having multiple M-shaped hulls and bow structure that enable performance at over fifty knots.

2. Description of Related Art

The term "M-shaped hull" as used herein refers to a boat hull falling within the scope of one or more claims of U.S. Pat. Nos. 6,250,245; 6,314,903; and 6,526,903. "M-hull craft" and "M craft" are watercraft that include one or more M-shaped hulls. The M-shaped hulls are designed to recapture the bow wave in order to use bow wave energy to create an air cushion for reduced friction drag. An M-shaped hull does this by including a central displacement section with a deck that extends laterally to support two vertical parallel skirts.

The skirts form planing tunnels on opposite sides of the central displacement section such that the skirts recapture the bow wave into the planing tunnels. The recaptured bow wave spirals through the planing tunnels, trapping incoming air and forcing it aft. The planing tunnel ceilings are sloped downward to the approximate water line about mid-ship so that they help compress the aerated water to form an air cushion for lift and reduced friction drag.

U.S. Pat. No. 6,868,798 describes a watercraft with an M-shaped boat hull that enhances the high-speed potential of M-hull craft by using one or more vertical steps in the planing surface of the displacement sections to further reduce friction drag. In addition, U.S. patent application Ser. No. 10/957,914 describes a watercraft having a self proportioning dual-exhaust system that is used to direct gas turbine or jet engine exhaust into the craft's planing surface at the vertical steps, thereby eliminating the vacuum drag and provide added vessel lift. These and other variations of the M-shaped hull have proven effective at the full range of speed, up to approximately fifty knots or so.

In test trials, a craft with a single M-shaped hull demonstrated a speed upwind 15% greater than downwind when operating at thirty to forty knots. That result indicates a dynamic wind lift with an M-shaped hull that increases with higher vessel speed, and it prompts one to think of super high speed watercraft, especially for anticipated future military applications. For super high speeds in the range of fifty to one hundred knots, however, the volume and velocity of wind entering the M-hull craft tends to destroy the bow wave spiral, with the incoming wind replacing the bow wave spiral as the means of forcing air aft under increasing pressure. Thus, the high-speed characteristic of the M-shaped hull is of significant interest, but a need exists for further refinements of existing M-shaped craft in order to enable performance at super high speeds.

SUMMARY OF THE INVENTION

This invention addresses the need outlined above by providing a watercraft having a wing-like deck structure atop multiple hulls, together with downwardly extending vertical skirts and planing tunnels similar to the bow-wave-capturing skirts and planing tunnels of an M-shaped hull. The resulting super high speed watercraft includes wider planing tunnels that eliminate dependence on the bow wave spiral for the lift associated with increased pressure in the planing tunnels. The deck structure includes an airfoil-like upwardly facing surface that adds the aerodynamic lift associated with decreased pressure over the deck. These elements combine to form what may be called a "floating wing" that is capable of performing at speeds well over fifty knots.

To paraphrase some of the more precise language appearing in the claims and further introduce the nomenclature used, a watercraft constructed according to the invention with at least one propulsion engine includes at least two hulls in spaced-apart parallel relationship to each other. A deck structure spans the two hulls, said deck structure extending laterally beyond a port hull of the two hulls to a port side of the deck structure and laterally beyond a starboard hull of the two hulls to a starboard side of the deck structure. A port skirt extending vertically downward from the port side of the deck structure combines with the port hull and the deck structure to form a forwardly opening and rearwardly extending port planing channel that is similar to the port planing channel of a multi-hull M-shaped watercraft. Similarly, a starboard skirt extending vertically downward from the starboard side of the deck structure combines with the starboard hull and the deck structure to form a forwardly opening and rearwardly extending starboard planing channel that is similar to the starboard planing channel of a multi-hull M-shaped watercraft.

According to a major aspect of the invention, the deck structure includes an upwardly facing surface that slopes downwardly toward an aft end of the deck structure in order to produce aerodynamic lift from air passing over the deck structure. This wing-like surface on the deck structure functions in a manner similar to that of a wing or other airfoil. In other words, it is a wing-like structure and it may include a leading edge that slopes back from the watercraft centerline thirty degrees or so, following the design of the B2 Flying Wing.

Preferably, planing tunnel width is greater than that of existing M-shaped watercraft and the slope of the planing tunnel ceiling is designed to maximize the volume and velocity of incoming air in order to thereby maximize the dynamic lift from the impact of entering air. In other words, the bow structure is designed to maximize the volume and velocity of air entering the planing tunnels and eliminate the dependence on the bow wave spiral for air compression. Preferably, the watercraft includes an enhanced propulsion system and planing lift from engine exhaust as described in U.S. patent application Ser. No. 10/957,914 filed Oct. 4, 2004 by the inventors of this patent application. One embodiment includes hinged laterally extending deck extensions that an operator can raise to reduce vessel breadth during docking, upwardly extending barriers on the deck extensions that reduce the escape of wind over the deck structure laterally, and hinged flap structures disposed rearwardly that enable an operator to adjust vessel trim.

Thus, the invention, in all its variations referred to as a "floating wing," significantly increases the speed capabilities of the M-hull with the structural improvements outlined above. Aerodynamic lift over the deck and dynamic lift from compressed air entering the planing tunnels, combine with enhanced propulsion and engine exhaust lift to enable super high-speed operation for military and other uses.

DESCRIPTION OF THE PREFERRED EMBODIMENTS

The description of the preferred embodiment begins with a Powered Watercraft With M-Shaped Hull introductory section of this specification that restates some information presented in U.S. patent application Ser. No. 10/625,135 filed Jul. 23, 2003 by the inventors of this patent application (now U.S. Pat. No. 6,868,798 issued Mar. 22, 2005). That background section makes reference to FIGS. 1–9 in describing watercraft having one or more planing surfaces and one or more steps in the planing surfaces at which exhaust is vented.

Next, information is presented in an Exhaust Proportioning System section of this specification that restates some information presented in U.S. patent application Ser. No. 10/957,914 filed Oct. 4, 2004 by the inventors of this patent application. That background section makes reference to FIGS. 10–13 in describing a watercraft having a dual exhaust system with means for controlling the proportions of exhaust vented at steps in the planing surfaces and to atmosphere according to exhaust back pressure. After that, information is presented in a Multi-Hull M-Shaped Watercraft section of this specification that restates some information presented in U.S. Pat. No. 6,314,903 issued Nov. 13, 2001 to the inventors of this patent application. That background section makes reference to FIGS. 14 and 15 in describing a watercraft having multiple M-shaped hulls.

Finally, a Super High Speed Multi-Hull Watercraft section of this specification is presented that makes reference to FIGS. 16–19 in describing a watercraft embodying the super high speed aspects of the invention for which patent protection is sought. A reader already familiar with the specifications and drawing figures of the above-identified patent applications and patent, may proceed directly to the additional information in the Super High Speed Multi-Hull Watercraft section.

Figure 1:
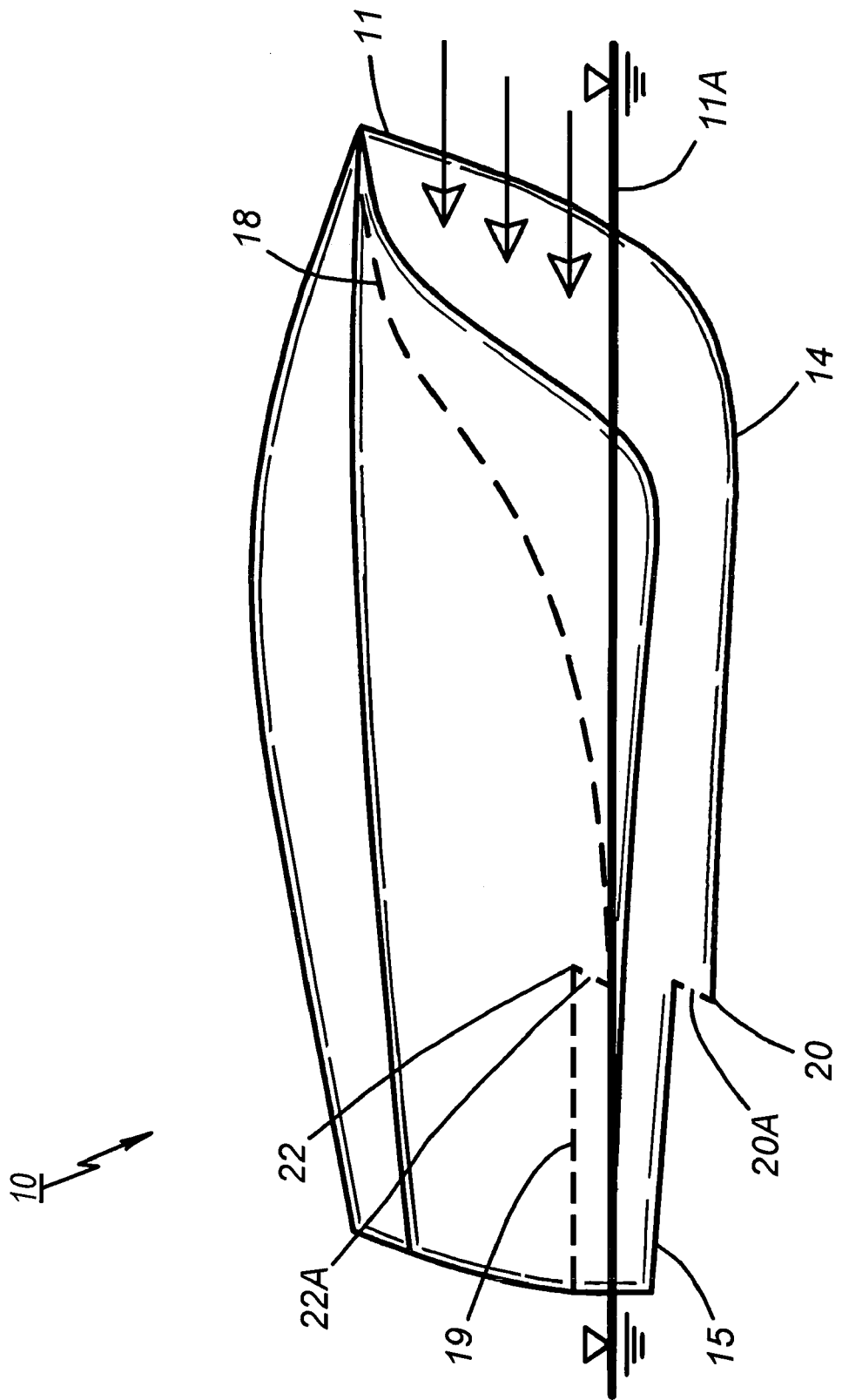
FIG. 1 of the drawings is a starboard side elevation view of a first watercraft that includes an M-shaped boat hull with vertical steps in the central displacement hull and the planing channels.
Figure 2:
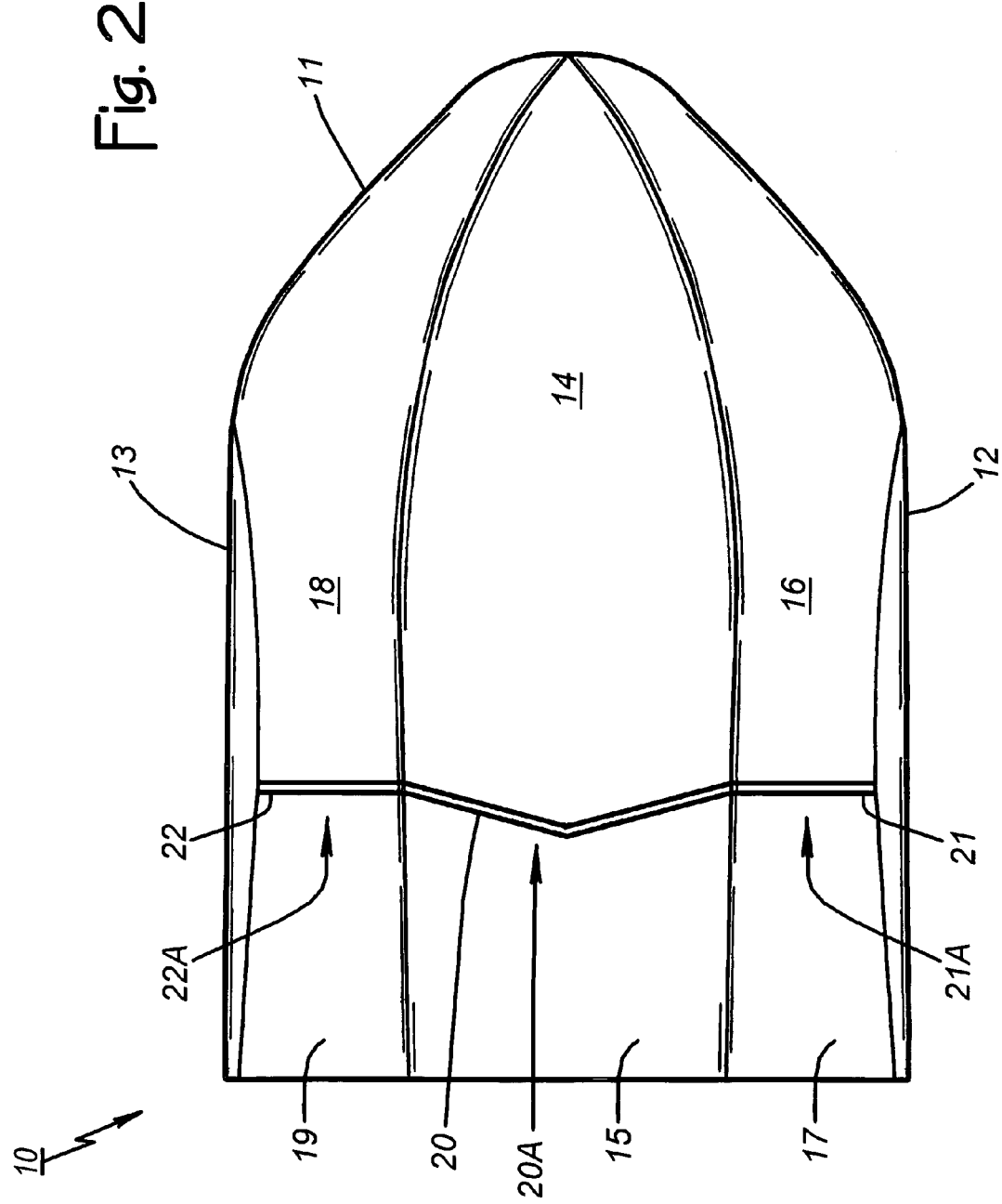
FIG. 2 is a diagrammatic plan view of the underside of the first watercraft showing the extension of the vertical steps that covers the entire central displacement body and the planing channels.
Figure 3:
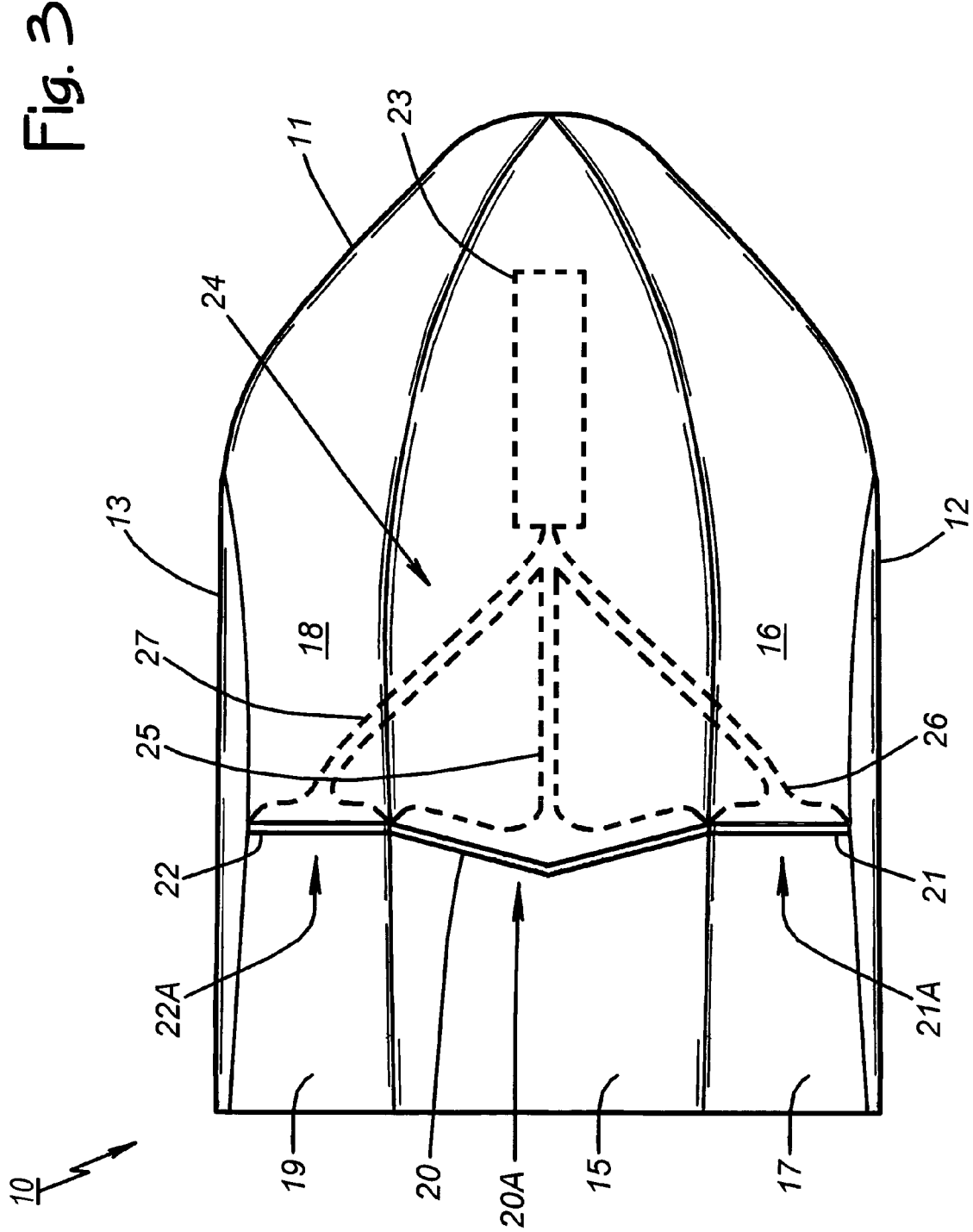
FIG. 3 is a diagrammatic view of the first watercraft similar to FIG. 2 that shows the exhaust-venting system for directing propulsion engine exhaust into the vertical steps.
Figure 4:
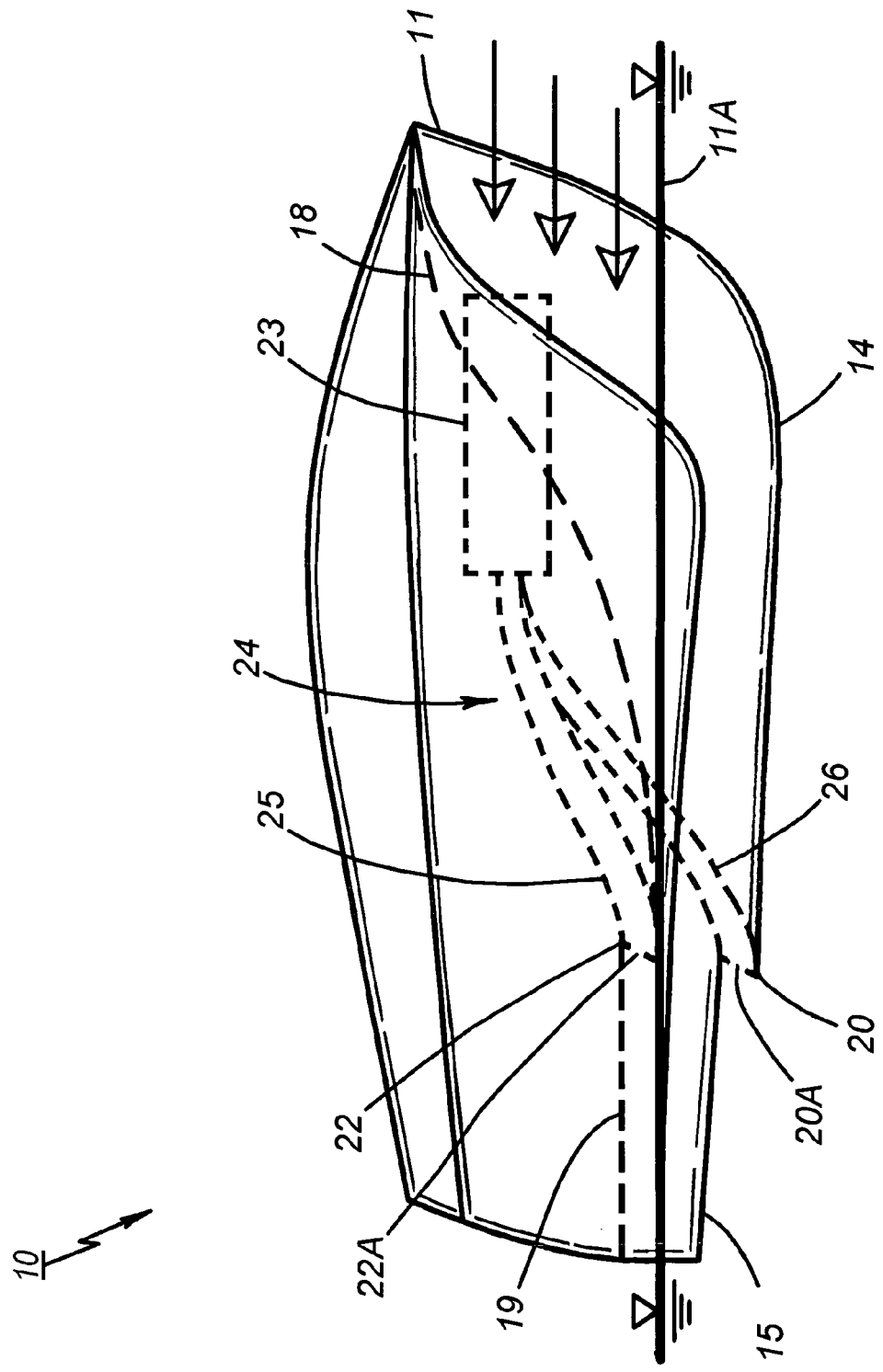
FIG. 4 is a starboard side elevation view of the first watercraft similar to FIG. 1 that includes the propulsion engine and the exhaust-venting system gas ducts leading into the vertical steps.

Powered Watercraft With M-Shaped Hull. FIGS. 1–4 of the drawings show various aspects of a powered watercraft 10. The watercraft 10 includes an M-shaped boat hull 11 having a port side 12 (FIGS. 2 and 3) and a starboard side 13 (FIGS. 1–4). The hull 11 includes a central displacement body 14 having a planing surface 15 (FIGS. 1–4), a port planing channel ceiling 16 having a planing surface 17, and a starboard planing channel ceiling 18 having a planing surface 19. FIGS. 1 and 4 include the static water line 11A and three arrows depicting the flow of air when the watercraft 10 is under way. Additional details of the M-shaped boat hull aspects of the watercraft 10 may be had by reference to U.S. Pat. Nos. 6,250,245; 6,314,903; and 6,526,903.

The watercraft 10 includes a first vertical step 20 (FIGS. 1–4) in the planing surface 15 of the central displacement body 14. The displacement body 14 portion of the hull 11 defines an exhaust-venting opening 20A at the first vertical step 20. The watercraft 10 also includes a second vertical step 21 in the planing surface 17 of the port channel ceiling 16 (FIGS. 2 and 3), and a third vertical step 22 in the planing surface 19 of the starboard channel ceiling 18 (FIGS. 1–4). The hull 11 defines a second exhaust-venting opening 21A at the second vertical step 21 (FIGS. 2 and 3) and a third exhaust-venting opening 22A at the third vertical step 22 (FIGS. 1–4). In that regard, the size of the vertical steps 20, 21, and 22 and the size of the exhaust-venting openings 20A, 21A, and 22A are not illustrated to scale. They are exaggerated for illustrated purposes in order to better identify them in the drawings.

An onboard propulsion engine 23 (FIGS. 3 and 4) powers the watercraft 10. It may take any of various known forms, including diesel, gas turbine, and jet engines, and it produces exhaust and surplus air that is conveyed by an exhaust-venting system 24 to the exhaust-venting openings 20A, 21A, and 22A. The exhaust-venting system 24 extends from the engine 23 to the exhaust-venting openings 20A, 21A, and 22A. It includes first, second, and third exhaust manifold branches 25, 26, and 27, each of which conveys exhaust from the engine 23 (e.g., via triangularly shaped ducts) to a respective one of the first, second, and third exhaust-venting openings 20A, 21A, and 22A. Stated another way, the exhaust-venting system 24 functions as means for venting exhaust from the onboard propulsion engine 23 at the vertical steps 20, 21, and 22 in the planing surfaces 15, 17, and 19 while under way in order to introduce gas along the planing surfaces. The high temperature of pressurized exhaust gas results in a film of high pressure gas along the planing surfaces 15, 17, and 19 that further reduces the friction drag for increased performance and efficiency.

Figure 5A:
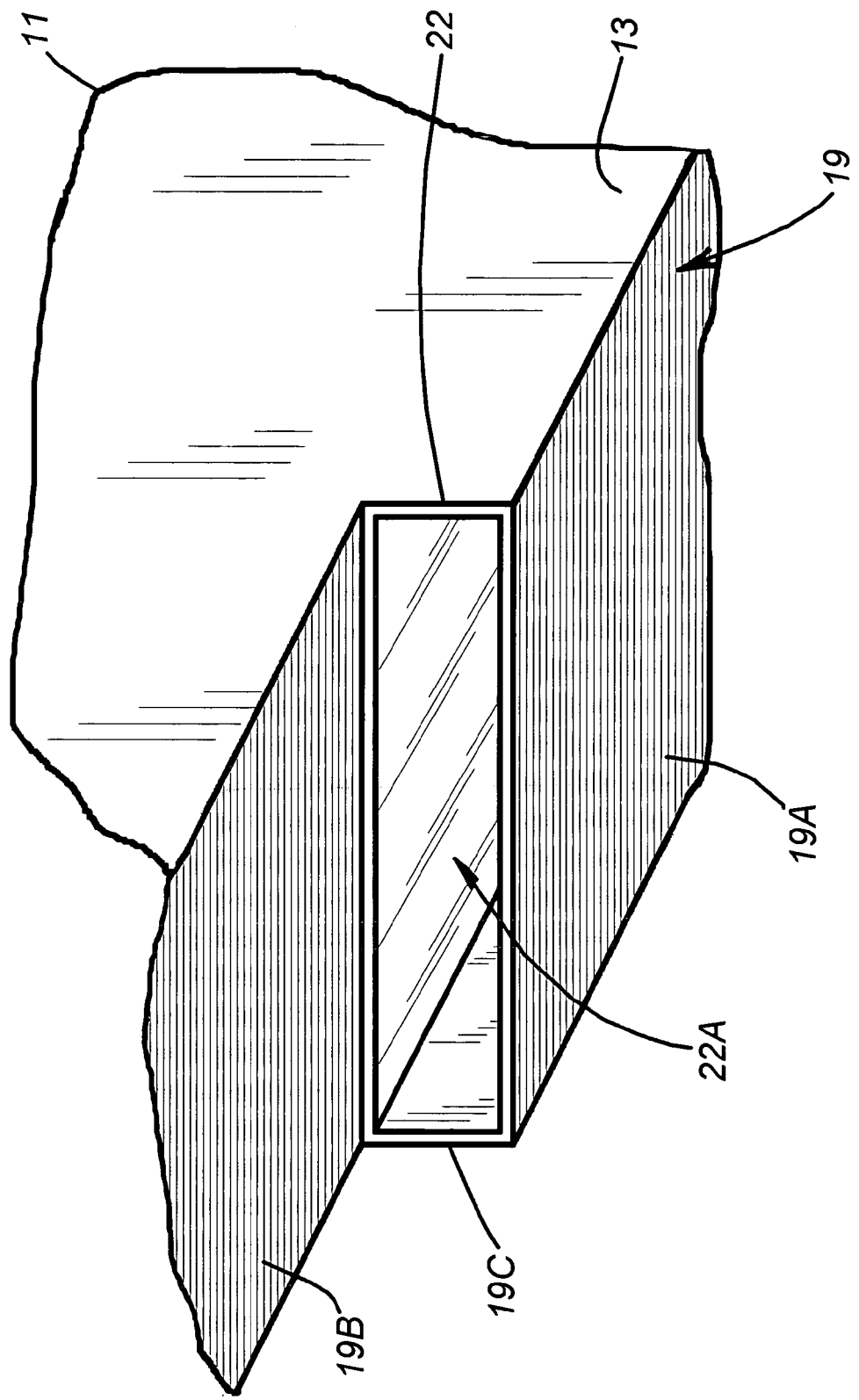
FIG. 5a is a diagram depicting an enlarged isometric view of a portion of the starboard side, the planing surface, and a vertical step of watercraft such that the exhaust-venting opening is located in the riser portion of the vertical step.
Figure 5B:
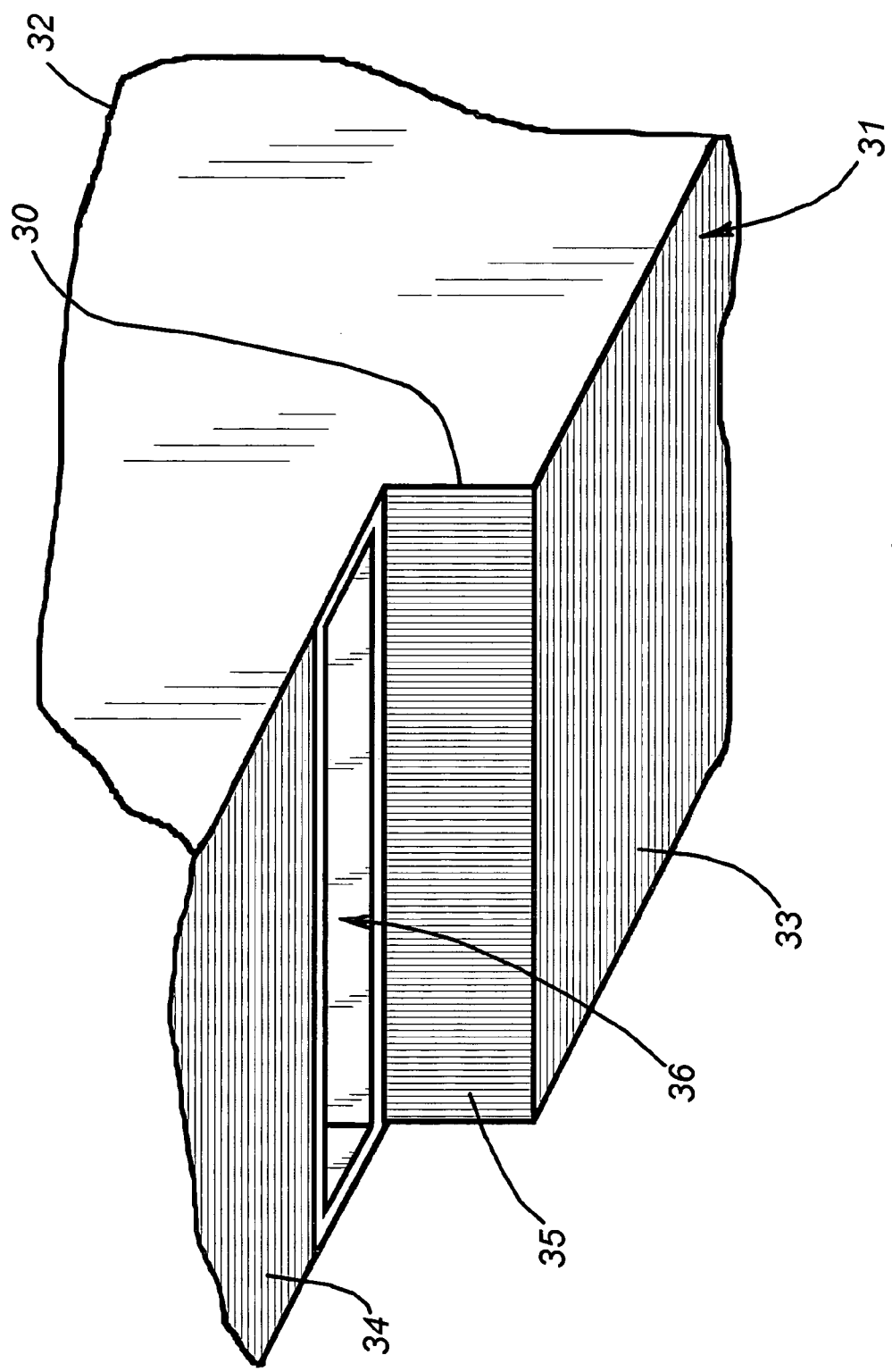
FIG. 5b is a diagram similar to FIG. 5a of an alternate exhaust-venting arrangement such that the exhaust-venting opening is located in the upper portion of the vertical step.

FIGS. 5a and 5b are diagrams that show further details of the exhaust-venting opening configuration. First consider FIG. 5a. It depicts an enlarged perspective view (not to scale) of the third vertical step 22 in the planing surface 19 adjacent the starboard side 13 of the hull 11. The vertical step 22 includes a forwardly disposed lower portion 19A at a first planing surface level of the planing surface 19 and a rearwardly disposed upper portion 19B at a second planing surface level of the planing surface 19 that is elevated relative to the first planing surface level by the height of a riser portion 19C of the third vertical step 22. The riser portion 19C defines the exhaust-venting opening 22A so that the exhaust-venting opening 22A faces rearwardly. In other words, the hull 11 defines an exhaust-venting opening 22A intermediate the upper and lower portions 19A and 19B that faces rearwardly from the vertical step 22. This is a preferred orientation.

FIG. 5b illustrates that other opening orientations may be employed. It depicts an enlarged perspective view of a vertical step 30 in a planing surface 31 of a hull 32. The vertical step 30 is similar in some respects to the third vertical step 22 illustrated in FIG. 5a in that it includes a forwardly disposed lower portion 33 at a first planing surface level of the planing surface 31 and a rearwardly disposed upper portion 34 at a second planing surface level of the planing surface 31 that is elevated relative to the first planing surface level by the height of a riser portion 35 of the vertical step 30. The major difference is that the upper portion 34 defines an exhaust-venting opening 36 that faces downwardly, with exhaust being vented through it downwardly. In other words, the hull 32 defines an exhaust-venting opening 36 in the upper portion 34 that faces downwardly from the upper portion 36.

Figure 6:
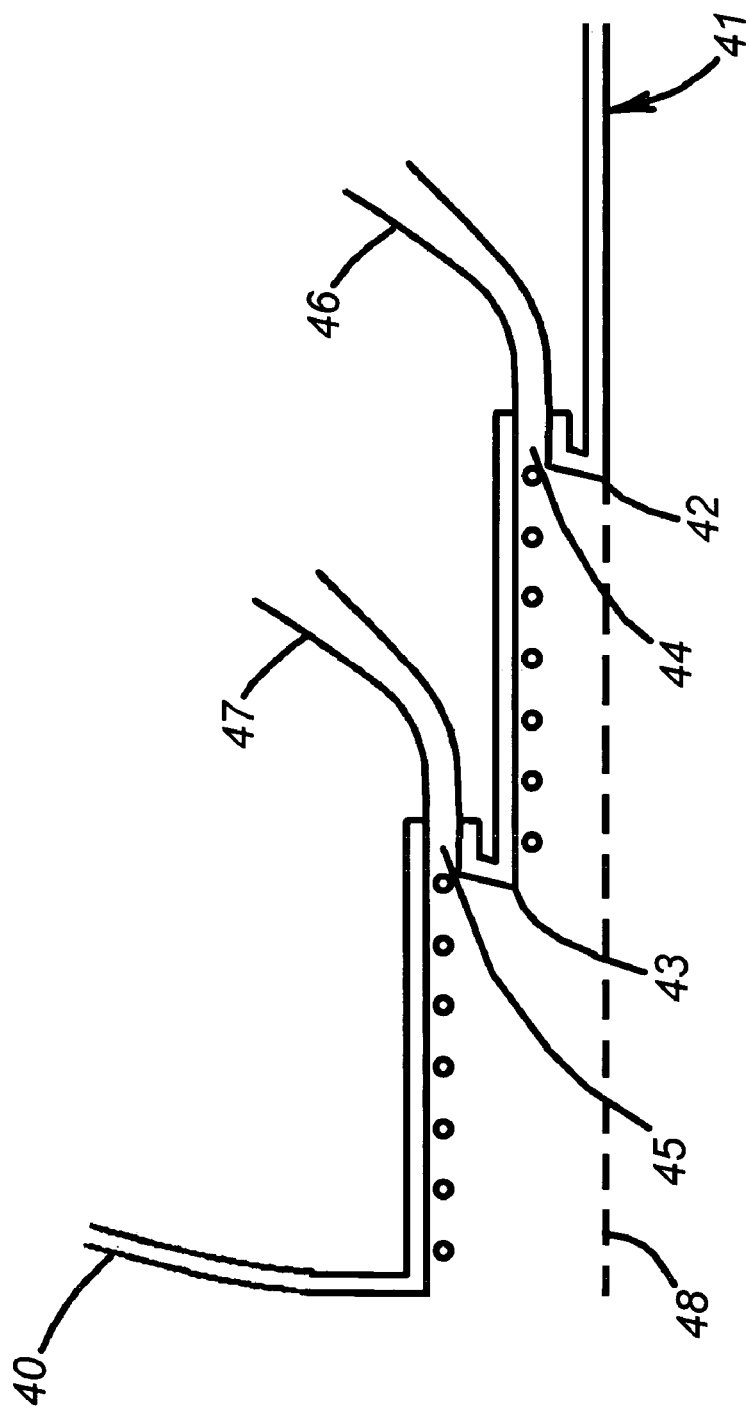
FIG. 6 is a diagrammatic starboard side elevation view of portions of a second watercraft that includes multiple vertical steps and an accompanying exhaust-venting system such that the planing level is raised at each step progressively.

Turning now to FIG. 6, it shows a portion of a hull 40 that illustrates one type of vertical step configuration. The hull 40 represents the hull of any powered watercraft. It has a planing surface 41, a forwardly disposed first vertical step 42 and a rearwardly disposed second vertical step 43. The hull 40 defines first and second exhaust-venting openings 44 and 45 through which exhaust manifold branches 46 and 47 vent exhaust. The small circles in FIG. 6 represent exhaust and surplus air venting through the exhaust-venting openings 44 and 45. In this vertical step configuration, the planing level is raised at each of the first and second vertical steps 42 and 43 progressively from an original planing level identified by the broken line at reference numeral 48.

Figure 7:
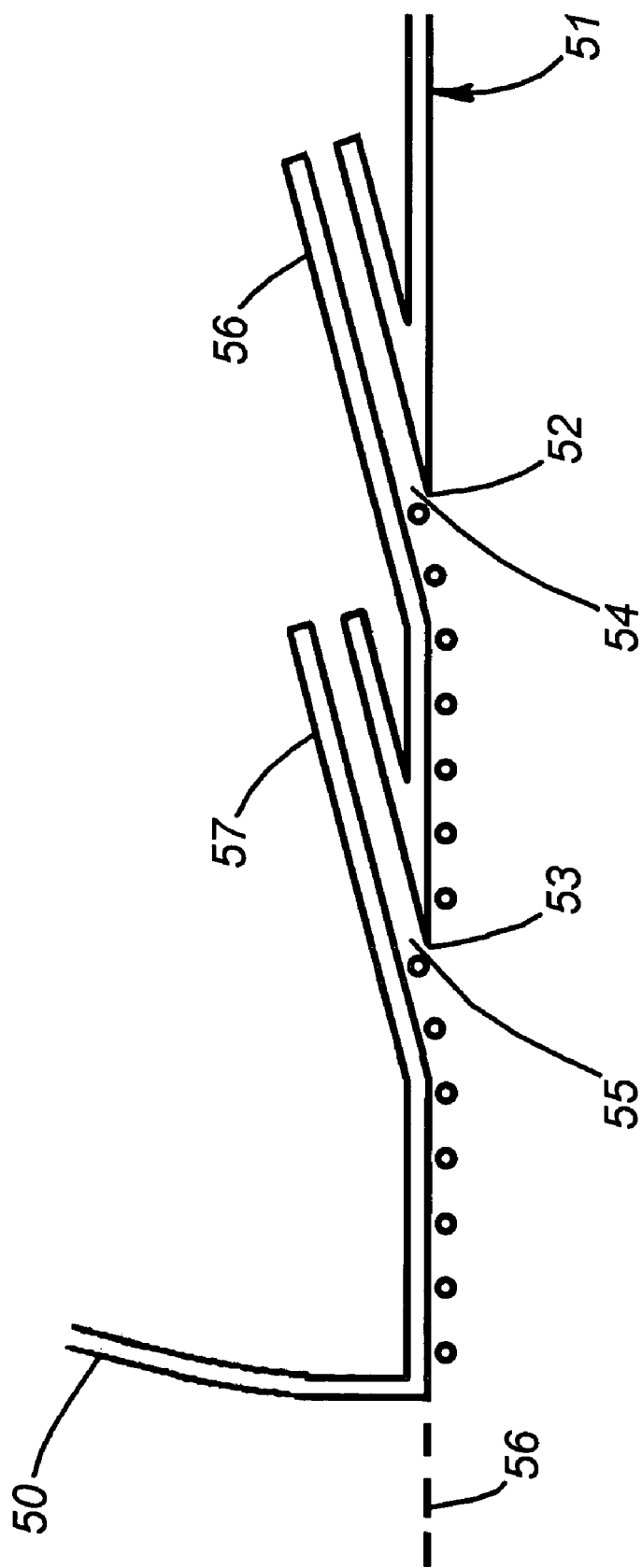
FIG. 7 is a diagrammatic starboard side elevation view of portions of a third watercraft that includes multiple vertical steps and an accompanying exhaust-venting system such that the planing level retracts after each step to the original planing surface.

FIG. 7 shows a portion of a hull 50 that illustrates another type of vertical step configuration. The hull 50 has a planing surface 51, a forwardly disposed first vertical step 52 and a rearwardly disposed second vertical step 53. The hull 50 defines first and second exhaust-venting openings 54 and 55 through which exhaust manifold branches 56 and 57 vent exhaust. The small circles represent exhaust and surplus air venting through the exhaust-venting openings 54 and 55. In this vertical step configuration, the planing level 51 raises at each of the first and second vertical steps 52 and 53 from an original planing level identified by the broken line at reference numeral 58, only to quickly return to the original planing level.

Figure 8:
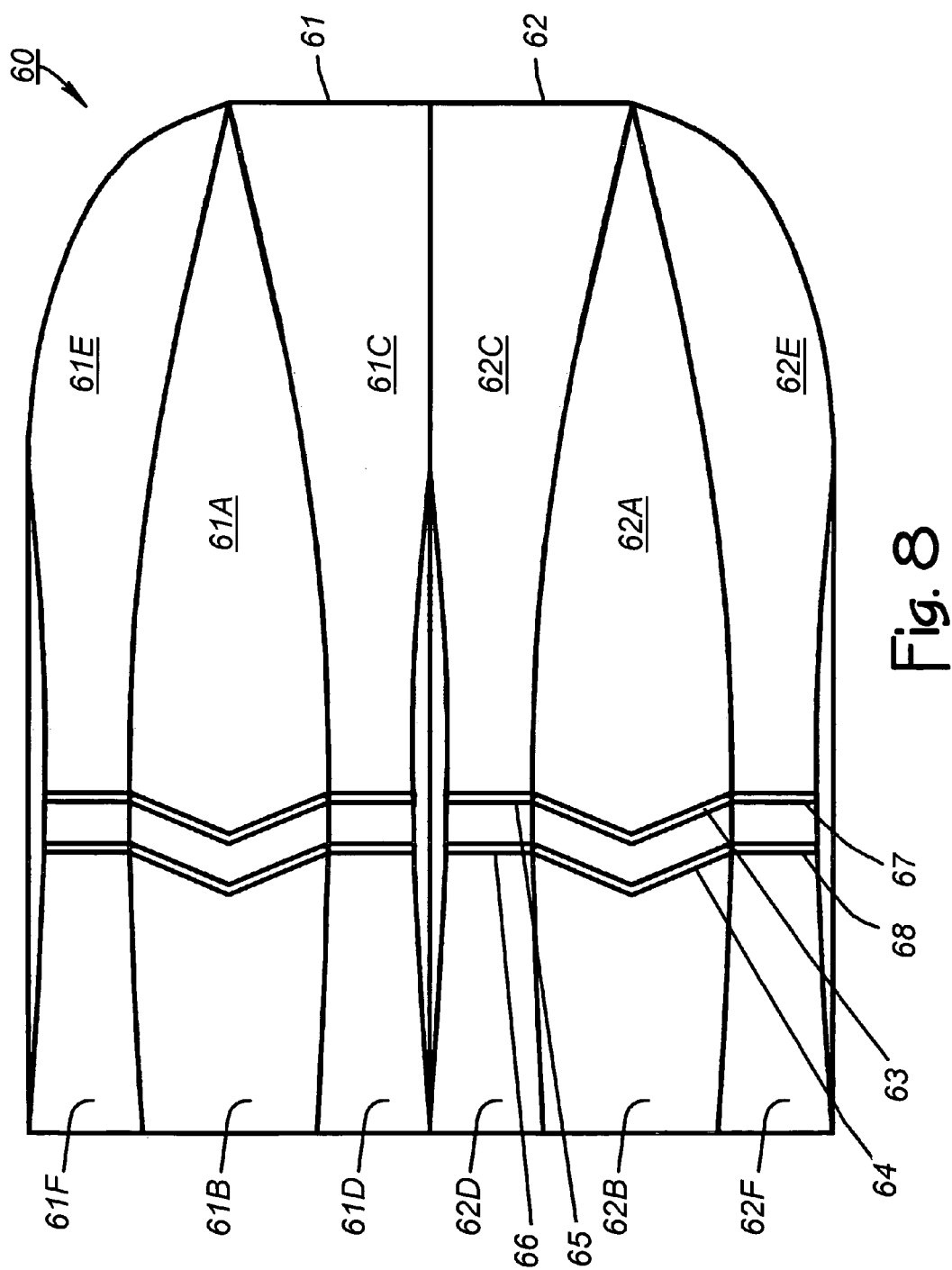
FIG. 8 is a diagrammatic plan view similar to FIG. 2 of the underside of a fourth watercraft having multiple hulls and multiple vertical steps in each hull.
Figure 9:
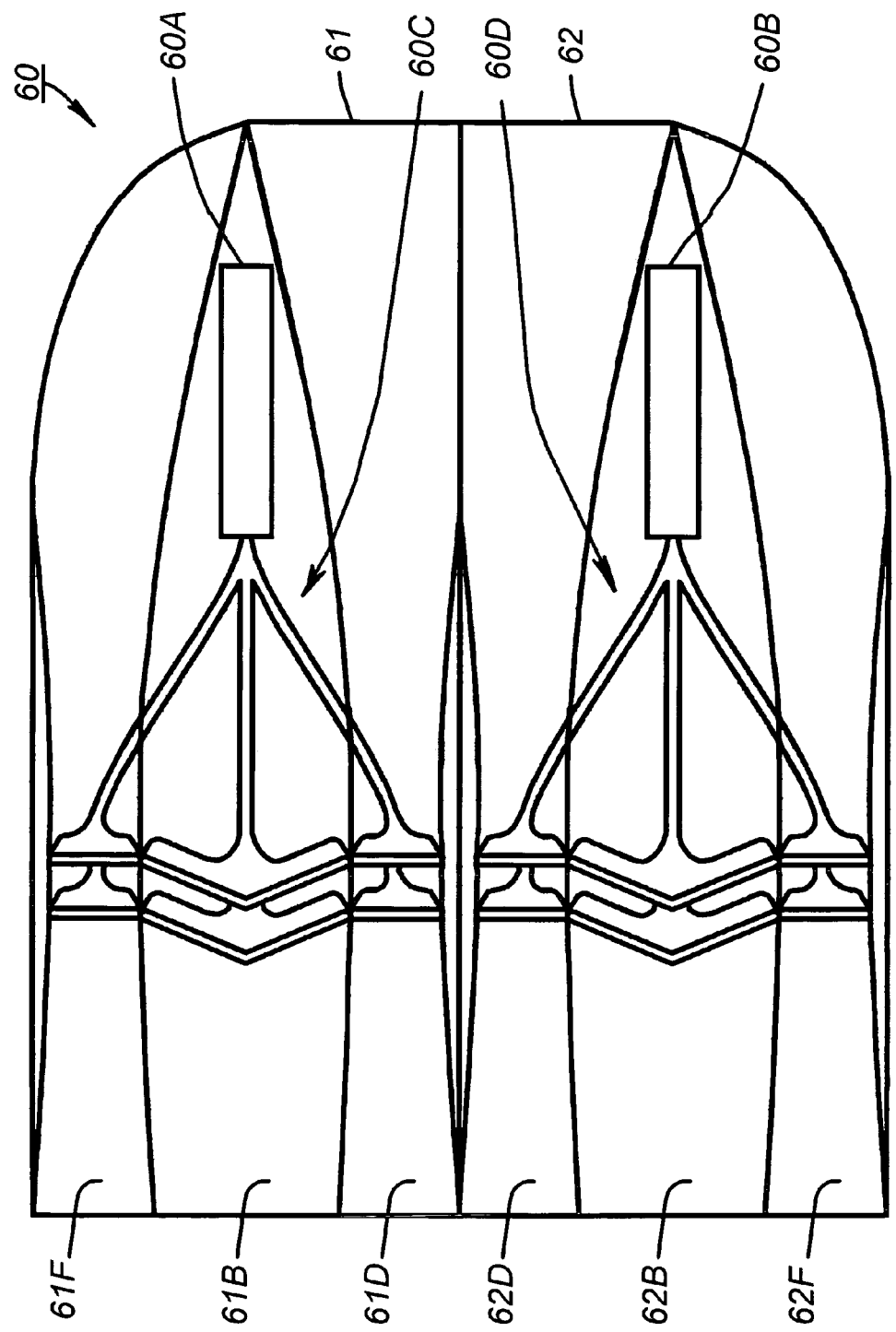
FIG. 9 is a diagrammatic plan view of the fourth watercraft that includes the exhaust-venting system for directing propulsion engine exhaust into the vertical steps.

FIG. 8 is a diagram depicting the underside of a multiple hull watercraft 60 constructed according to the invention. It includes a first hull 61 and a second hull 62. The first hull 61 includes a central displacement body 61A with a planing surface 61B, an inwardly disposed first channel ceiling 61C with a planing surface 61D, and an outwardly disposed second channel ceiling 61E with a planing surface 61F. Similarly, the second hull 62 includes a central displacement body 62A with a planing surface 62B, an inwardly disposed first channel ceiling 62C with a planing surface 62D, and an outwardly disposed second channel ceiling 62E with a planing surface 62F. Each planing surface includes two vertical steps arranged in line to span the width of the planing multiple surfaces. Just the six vertical steps 63, 64, 65, 66, 67, 68 are identified for the three planing surfaces 62B, 62D, and 62F of the second hull 62 for illustrative convenience. FIG. 9 shows the watercraft 60 with first and second propulsion engines 60A and 60B connected to the vertical steps via first and second exhaust-venting systems 60C and 60D.

Thus, the powered watercraft embodiments described above include means for venting propulsion engine exhaust at one or more vertical steps in one or more planing surfaces on the watercraft. Doing so introduces gas along the planing surface (preferably high temperature gas) that significantly improves performance and efficiency. That technique is shown applied to watercraft with single or multiple M-shaped boat hulls that include single or multiple vertical steps in each planing surface. In that regard, the term "M-shaped boat hull" herein refers to a boat hull that falls within the scope of one or more of the claims in U.S. Pat. Nos. 6,250,245; 6,314,903; and 6,526,903. Those patents are incorporated herein by reference for all of the details they provide.

Figure 10:
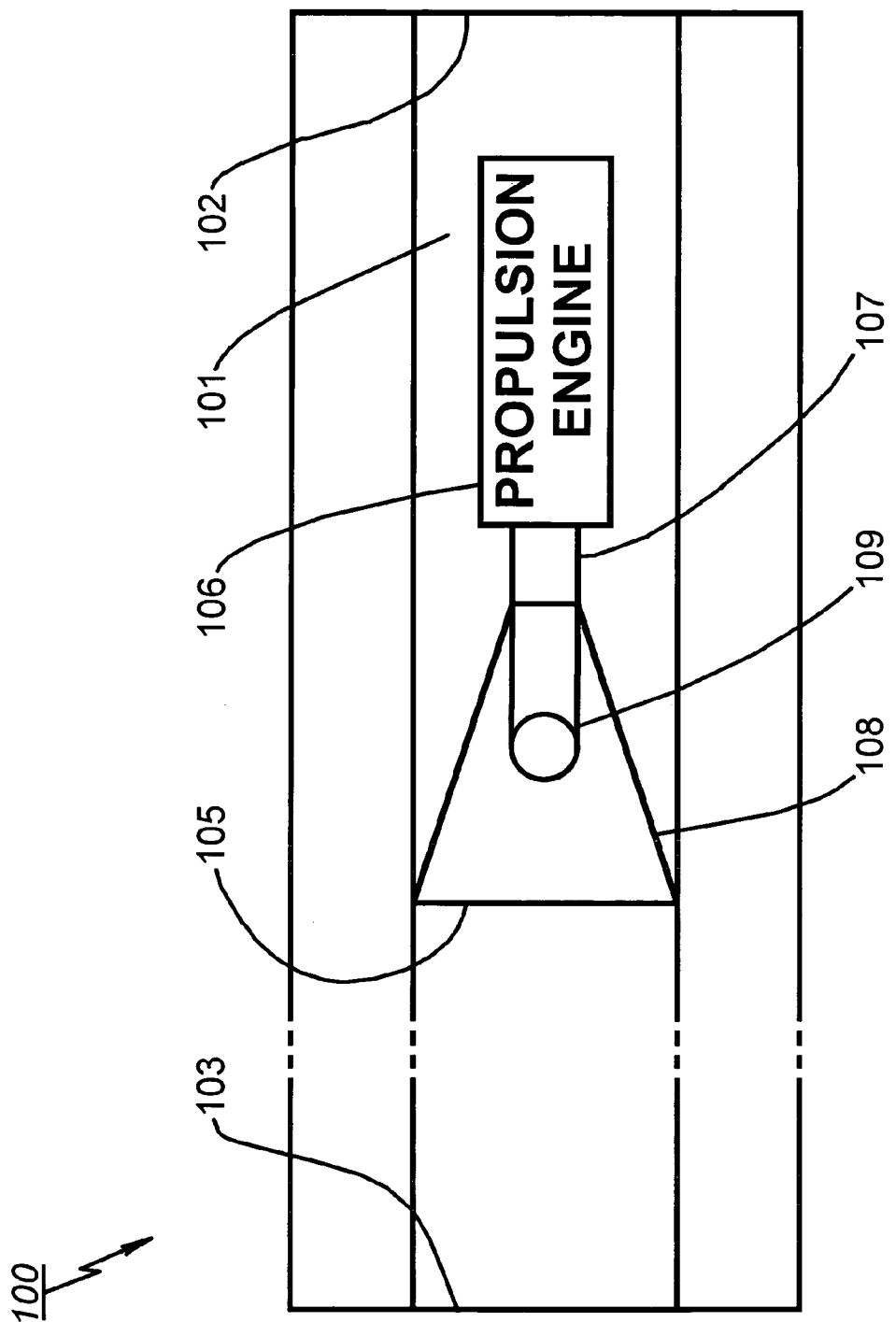
FIG. 10 is a diagrammatic plan view of a fifth watercraft that includes proportional sea and air exhaust ducting according to the invention.
Figure 11:
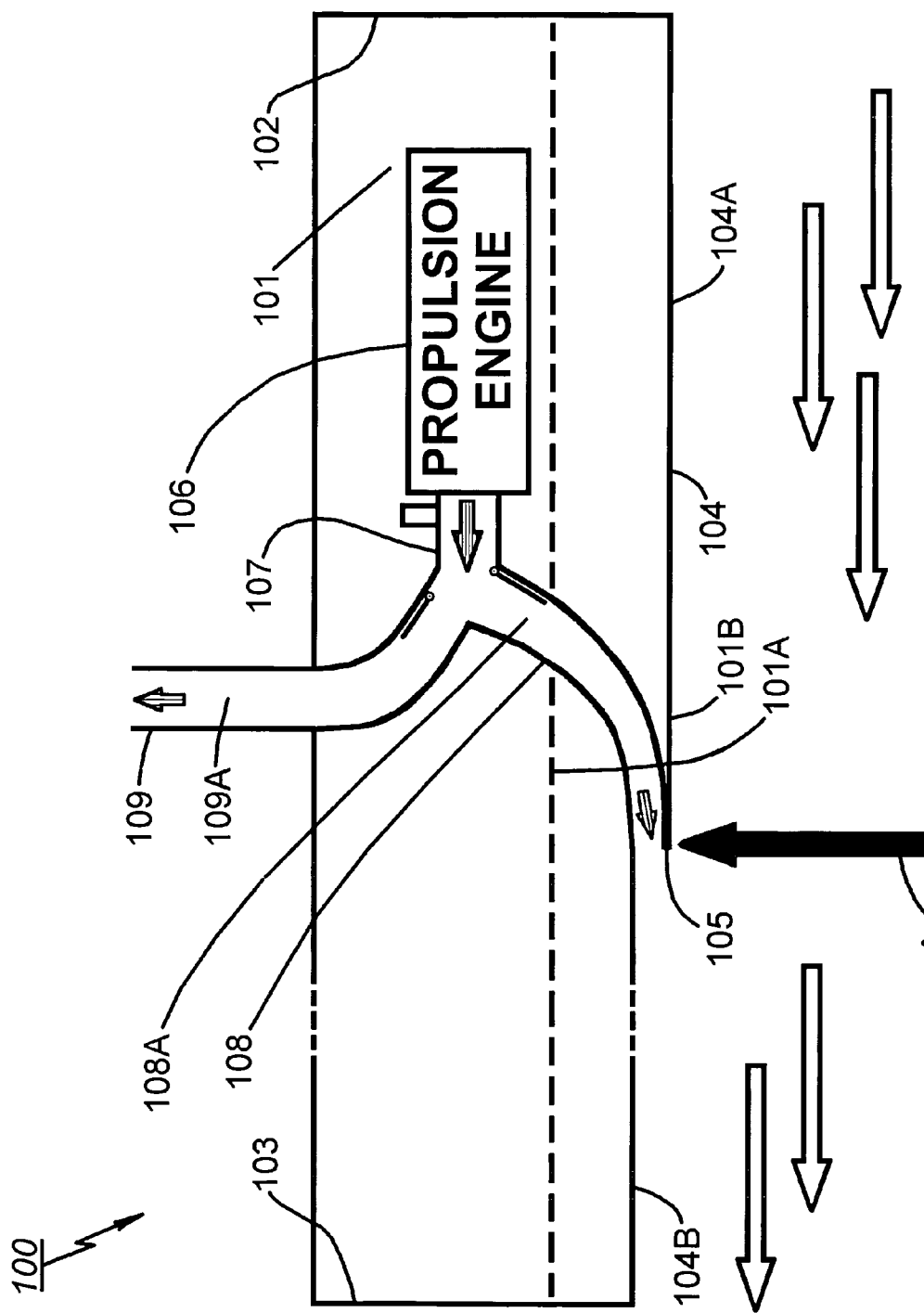
FIG. 11 is a diagrammatic elevation view of the fifth watercraft.
Figure 12:
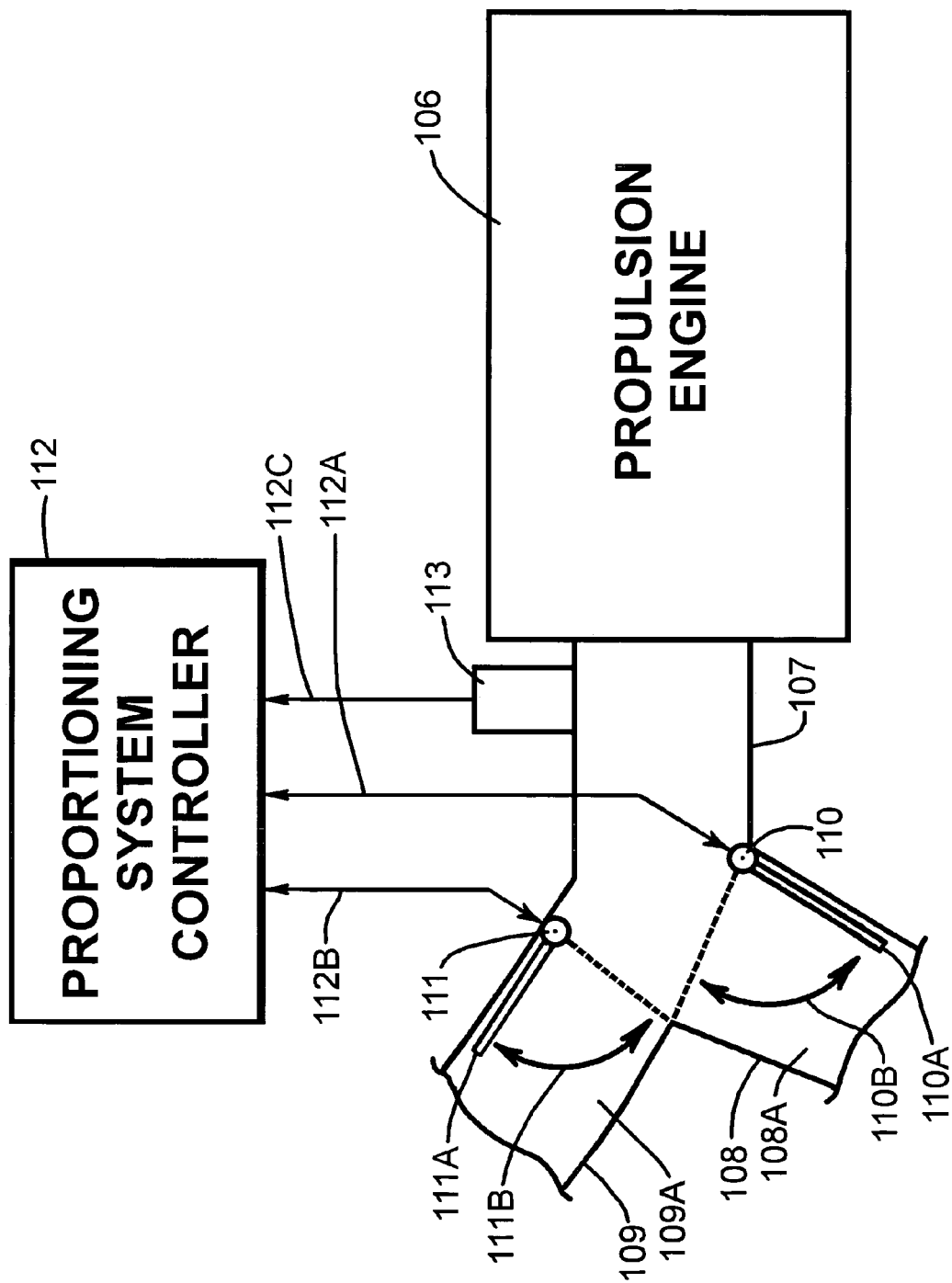
FIG. 12 is an enlarged portion of FIG. 11 showing further details of the onboard exhaust proportioning system.

Exhaust Proportioning System. Turning now to FIGS. 10, 11, and 12, they are diagrammatic representations of a fifth watercraft 100 constructed according to the invention to include an exhaust proportioning system. The watercraft 100 includes a hull 101 (e.g., a displacement hull) having a static water line indicated by a broken line 101A in FIG. 11. The hull 101 extends from a bow 102 of the hull 101 to a stern 103 of the hull 101 (FIGS. 10 and 11. The hull 101 includes an underside 101B (FIG. 11) that faces downwardly toward water and the underside 101B includes a planing surface 104 (FIG. 11). In addition, the watercraft 100 includes a transverse vertical step 105 in the planing surface 104 (FIGS. 10 and 11). The step 105 is disposed intermediate a forward portion 104A of the planing surface 104 and a rearward portion 104B of the planing surface 104 that are identified in FIG. 11 (e.g., located at two-thirds of the distance from the bow 102 to the stern 103).

The watercraft 100 includes a propulsion engine 106 (e.g., a gas turbine engine) that produces exhaust with an exhaust back pressure. The engine 106 discharges exhaust through an exhaust manifold 107 to first and second exhaust conduits 108 and 109 (FIGS. 10–12). The first exhaust conduit 108 defines a first exhaust flow path 108A leading to the underside 101B of the hull 101 (at the step 105 shown in FIGS. 11 and 12 for the illustrated embodiment) in order to vent a first proportion of the exhaust at the underside 101B (at the step 105), while the second exhaust conduit 109 defines a second exhaust flow path 109A to atmosphere in order to vent a second proportion of the exhaust to atmosphere. The first and second conduits 107 and 108 may include known exhaust ducting componentry.

Venting exhaust at the underside 101B of the hull 101 (e.g., at the step 105) improves operating efficiency by reducing drag. In addition, it increases lift as depicted by a bold arrow A in FIG. 11 (the outlined arrows depicting water flow across the underside of the hull and the shaded arrows depicting exhaust flow). Moreover, venting exhaust at the underside 101B (e.g., at the step 105 for the illustrated embodiment) reduces thermal signature by directing the first proportion of hot exhaust gases into water beneath the underside 101B of the hull 101 so that exhaust heat is dissipated in the water.

In order to control the first and second exhaust flow paths 108A and 109A, the watercraft 100 includes an onboard exhaust proportion system. As shown in FIG. 12, the exhaust proportioning system of the watercraft 100 includes a first valve mechanism 110 having a first valve element 110A that moves in operation as indicated in FIG. 12 by a double-headed arrow 110B. The first valve mechanism 110 serves as means for selectively restricting the first exhaust flow path 108A in order to decrease a first proportion of the exhaust flowing in the first flow path 108A and thereby direct a desired second proportion of the exhaust from the propulsion engine 106 to the second flow path 109A. It may also be use to prevent the back flow of water from the step 105 when the watercraft 100 moves astern. The exhaust proportioning system also includes a second valve mechanism 111 having a second valve element 111A that moves in operation as indicated by a double-headed arrow 111B. The second valve mechanism 111 serves as means for selectively restricting the second exhaust flow path 109A in order to decrease the second proportion of the exhaust flowing to the second flow path 109A and thereby direct the desired first proportion of the exhaust from the propulsion engine 106 to the first flow path 108A. The first and second valve mechanisms 110 and 111 may include known types of componentry for performing the described functions.

In addition to the above, the exhaust proportioning system of the watercraft 100 includes a proportioning system controller 112 and an exhaust back pressure sensor 113. The controller 112 serve as means for controlling the first valve means 110 and the second valve means 111 according to exhaust back pressure. The sensor 113 serves as means for sensing the exhaust back pressure and providing a feedback signal for the controller 112 for overall closed-loop feedback control of the first and second valve mechanisms 110 and 111 according to exhaust back pressure.

For the illustrated watercraft 100, exhaust is drawn toward the step 105 when underway by the vacuum created at the step 105 until the path of least resistance leads to atmosphere. Operating the second valve mechanism 111 forces more exhaust toward the step 105; it increases the first proportion of the exhaust that is vented at the step 105. Operating the first valve mechanism 110 forces more exhaust to atmosphere; it increases the second proportion of the exhaust that is vented to atmosphere. This is all accomplished entirely electronically in the illustrated embodiment with suitable components (e.g., a suitably programmed and outfitted laptop computer) although it is within the broader inventive concepts disclosed to use a back pressure gauge along with manual control of the valve mechanisms.

In FIG. 12, a first two-way line 112A (arrows at both ends) communicates control signals from the controller 112 to the first valve mechanism 110 together with communicating position-indicating feedback signals back to the controller 112 for closed loop feedback control of the first valve mechanism 110. Similarly, a two-way line 112B communicates control signals to the second valve mechanism 111 together with communicating position-indicating feedback signals back to the controller 112 for closed loop feedback control of the second valve mechanism 111. A one-way line 112C (an arrow at just one end) communicates back-pressure-indicating signals from the pressure sensor 113 to the controller 112 that the controller 112 processes according to preprogrammed algorithms to control the first and second valve mechanisms 110 and 111. Based upon the foregoing and subsequent descriptions, one of ordinary skill in the art can readily implement a watercraft with a dual exhaust and exhaust proportioning system according to the invention.

Figure 13:
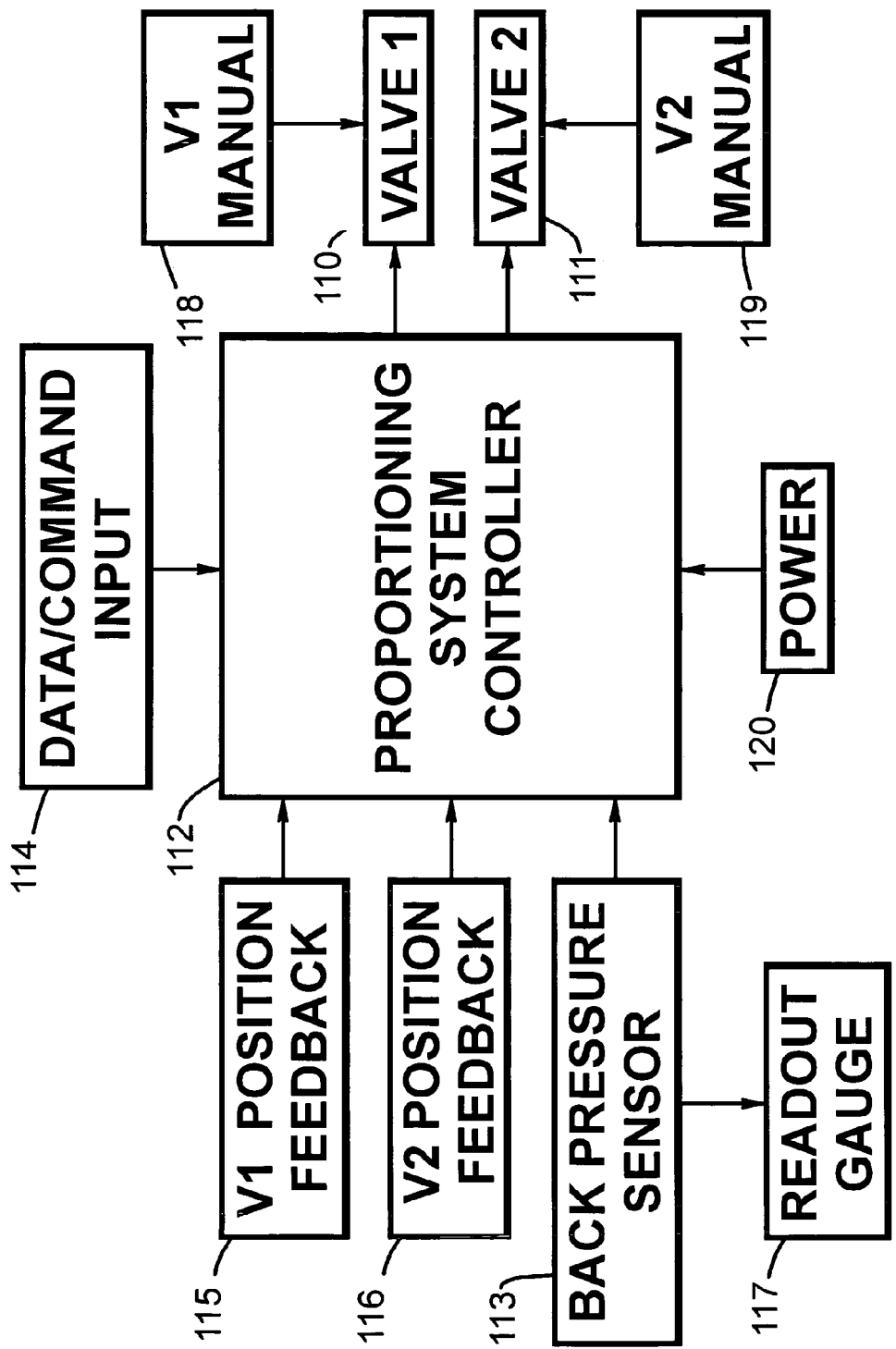
FIG. 13 is a block diagram of the onboard proportioning system with manual controls included.

Turning now to FIG. 13, it is a block diagram of the exhaust proportioning system of the watercraft 100 that shows the addition of manual controls. An input device 114 (e.g., a computer keyboard) enables operator input of data and commands to the controller 112. A first valve position feedback component 115 provides valve-position-indicating signals for the first valve mechanism 110 and a second valve-position feedback component 116 provides valve-position-indicating signals for the second valve mechanism 111. A pressure-readout component 117 (e.g., a gauge) provides a visually discernible indication of back pressure, while first and second manual valve actuators 118 and 119 enable an operator to actuate respective ones of the first and second valve mechanisms 110 and 111 when desired. Suitable power components 120 provide power to the system.

The objective of this dual exhaust duct system is to direct the highest proportion of total engine exhaust into the first exhaust conduit 108 so that engine exhaust can be used effectively to benefit vessel performance. The exhaust flowing into the first exhaust conduit 108 breaks the vacuum at the vertical step 105 that is created by forward motion of the vessel. In addition, it provides lubrication and reduced friction drag on the planing surface 104, and it generates steam for vessel lift.

A portion of the total exhaust will flow naturally into the first exhaust conduit 108 as required to break the vacuum at the vertical step 105 (self proportioning); that vacuum increases with vessel speed. This reduces the engine back-pressure below the maximum acceptable level for engine performance. Thus, additional exhaust can be directed into the first exhaust conduit 108 by closing down on the second valve mechanism 111. Doing so increases the engine back-pressure and results in a greater volume of exhaust moving through the first exhaust conduit 108. Operating the second valve mechanism 111 with regard for the level of back-pressure sensed by the sensor 113, prevents an increase in the back-pressure from this action to a level adversely affecting engine performance.

One way to configure the invention is to structure the first is valve mechanism 110 as a flapper-type valve to perform two separate functions. Activated manually or automatically based on vessel speed or other factor, it controls exhausting into the water in order to avoid overheating of the hull 101 when the vessel 100 is not moving forward. Activated by reverse water flow, it prevents engine damage when the vessel is moving astern. As an alternative, a separate and supplemental flapper-type valve (not shown) may be mounted at the entry to the first exhaust conduit 108 at the underside of the hull 101. Another way to configure the invention is to structure the proportioning system as a "speed-responsive" exhaust proportioning system that need not rely on exhaust valving. The speed-responsive exhaust proportioning system relies on the vacuum generated at the vertical step in the planing surface to automatically draw in propulsion engine exhaust increasingly with increasing vessel speed.

In terms of the methodology employed, the invention provides a method for reducing the thermal signature of a watercraft having a hull with an underside and an onboard propulsion engine that produces exhaust. The method includes the step of providing a first exhaust conduit for venting a first proportion of the exhaust at the underside of the hull, a second exhaust conduit for venting a second proportion of the exhaust to atmosphere, and, preferably, an onboard exhaust proportioning system for varying the first and second proportions according to exhaust back pressure. The method proceeds by (i) venting a first proportion of the exhaust through the first exhaust conduit at the underside of the hull (ii) venting a second proportion of the exhaust through the second exhaust conduit to atmosphere, and, preferably, (iii) varying the first and second proportions with the exhaust proportioning system to maintain a desired level of exhaust back pressure.

Thus, the foregoing describes a watercraft with a dual exhaust and, in one embodiment, an onboard exhaust proportioning system. The dual exhaust vents exhaust to the underside of the hull and to atmosphere while the exhaust proportioning system varies the proportion of total exhaust vented at each of those locations, preferably according to exhaust back pressure. Doing so maintains back pressure and heating at an acceptable level with improved efficiency and reduced thermal signature.

Figure 14:
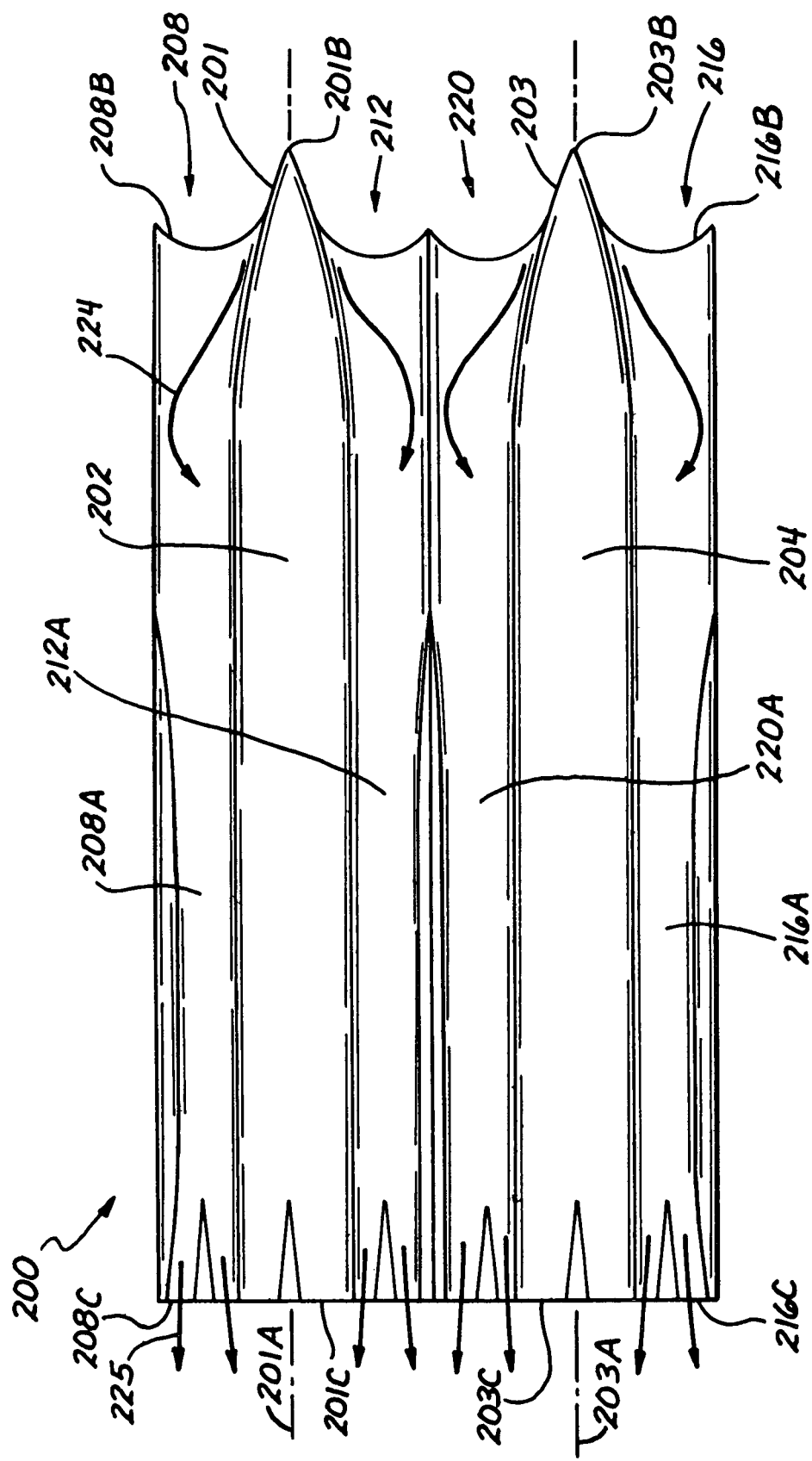
FIG. 14 shows a plan view of the underside of a twin-hull watercraft with multiple M-shaped hulls, depicting large bow waves, small internal skirt waves, planing wings, spiral channel sections on the planing wings, two central displacement bodies, tapered outer and inner skirts, wing channels formed in the planing wings, and hydrodynamic serrations, both on the central displacement bodies and in the wing channels.
Figure 15:
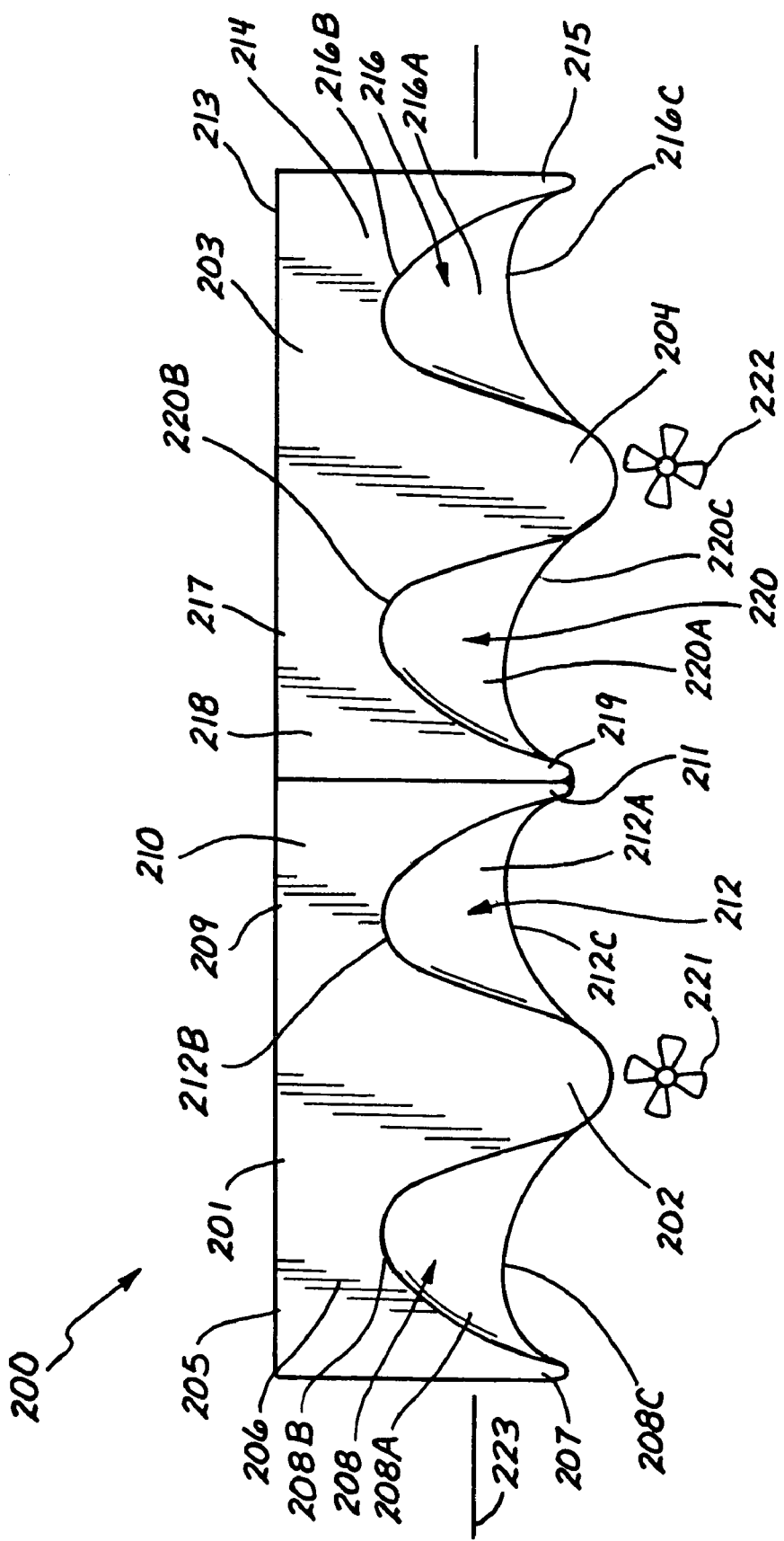
FIG. 15 shows an enlarged transverse section of the motored twin-hull watercraft with M-shaped hulls, depicting the two central displacement body portions, four wing channels, and tapered skirts that capture and suppress the bow waves; two propellers are shown, one mounted on each of the two central displacement bodies.

Multi-Hull M-Shaped Watercraft. Referring now to FIGS. 14 and 15, they show a multi-hull M-shaped watercraft with M-shaped hulls constructed according to the invention in the form of a twin-hull watercraft 200. Although the watercraft 200 includes two M-shaped hulls, a multi-hull M-shaped watercraft constructed according to the invention may have more than two hulls. The watercraft 200 includes a first hull 201 (a starboard hull) with a first displacement body 202 and a second hull 203 (a port hull) with a second displacement body 204. The first hull 201 extends along a first longitudinal axis 201A (FIG. 14) between a fore end 201B and an aft end 201C of the first hull, and the second hull 203 extends along a second longitudinal axis 203A between a fore end 203B and an aft end 203C of the second hull. Each of the hulls 201 and 203 is similar in many respects to the M-shaped hull 1 described in U.S. Pat. No. 6,250,245 issued Jun. 26, 2001 (previously herein incorporated by reference), and so only differences are focused upon in the following description.

A first outboard channel-defining structure 205 (FIG. 15) that is part of the first hull 201 includes a first outboard wing 206 (i.e., a starboard wing) and a downwardly extending first outboard skirt 207 (i.e., a starboard skirt) that cooperatively define a first outboard wing channel 208 (i.e., a starboard planing channel). As is apparent from FIGS. 14 and 15, these elements are "outboard" in the sense that the first outboard skirt 207 occupies a position disposed outwardly from the first displacement body 202 such that the first displacement body 202 is disposed intermediate the first outboard wing 207 and the second displacement body 204. A first inboard channel-defining structure 209 that is also part of the first hull 201 includes a first inboard wing 210 and a first inboard skirt 211 (FIG. 15) that cooperatively define a first inboard wing channel 212. These elements are "inboard" in the sense that the first inboard skirt 211 occupies a position disposed inwardly from the first displacement body 202 such that the first inboard skirt 211 is disposed intermediate the first displacement body 202 and the second displacement body 204.

Similarly, a second outboard channel-defining structure 213 that is part of the second hull 203 includes a second outboard wing 214 (i.e., a port wing) and a downwardly extending second outboard skirt 215 (i.e., a port skirt) that cooperatively define a second outboard wing channel 216 (i.e., a port planing channel). These elements are "outboard" in the sense that the second outboard skirt 211 occupies a position disposed outwardly from the second displacement body 204 such that the second displacement body 204 is disposed intermediate the second outboard wing 207 and the first displacement body 202.

A second inboard channel-defining structure 217 that is also part of the second hull 203 includes a second inboard wing 218 and a second inboard skirt 219 (FIG. 15) that cooperatively define a second inboard wing channel 220. These elements are "inboard" in the sense that the second inboard skirt 219 occupies a position disposed inwardly from the second displacement body 204 such that the second inboard skirt 219 is disposed intermediate the second displacement body 204 and the first displacement body 202.

The wing channel 208 includes a wing channel ceiling 208A (a planing channel ceiling) that extends from a forward portion 208B of the wing channel ceiling to an aft portion 208C (FIGS. 14 and 15), and the wing channel 212 includes a wing channel ceiling 212A (a planing channel ceiling) that extends from a forward portion 212B of the wing channel ceiling 212A to an aft portion 212C. Similarly, the wing channel 216 includes a wing channel ceiling 216A that extends from a forward portion 216B of the wing channel ceiling 216A to an aft portion 216C, and the wing channel 220 includes a wing channel ceiling 220A that extends from a forward portion 220B of the wing channel ceiling 220A to an aft portion 220C. A first propeller 221 (FIG. 15) is mounted on the displacement body 202 and a second propeller 222 is mounted on the displacement body 204. So, the watercraft 200 is a motor powered watercraft, although FIGS. 14 and 15 are intended to also illustrate germane aspects of a sail powered multi-hull watercraft constructed according to the invention. Reference numeral 223 designates the static waterline.

Thus, the watercraft 200 is a multi-hull M-shaped watercraft (i.e., a watercraft having two or more hulls). Each hull has a displacement body flanked by channel-defining structures that define planing channels (i.e., wing channels) so that the downwardly extending skirts capture bow waves and direct them spiraling rearward within the wing channels as described in U.S. Pat. No. 6,250,245 with reference to a single M-Shaped hull 1 therein illustrated. In other words, the watercraft 200 has two M-shaped hulls and four arcuate channels adapted to contain the spiraling bow waves from the two central displacement bodies, thereby to increase lateral stability and to suppress boat waves to protect nearby boats and structures at the water/land interface. This action is illustrated in FIG. 14 by arrows at the fore end of the watercraft 200 (one arrow 224 being designated) that depict incoming bow waves, and arrows at the aft end (one arrow 225 being designated) that depict energy-dissipated aerated water exiting the aft end of the wing channels.

Figure 16:
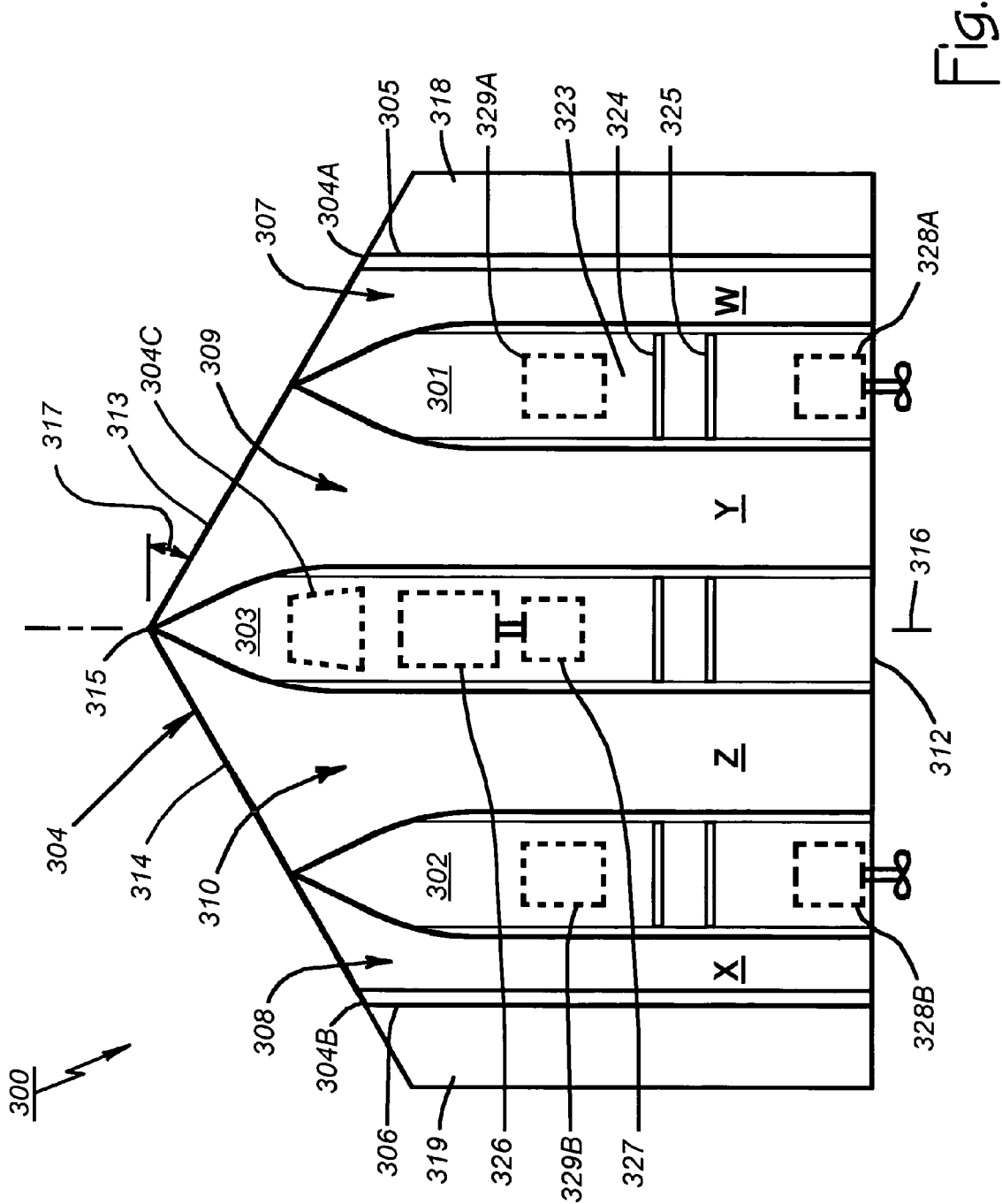
FIG. 16 is a diagrammatic plan view of the underside of a super high speed multi-hull watercraft constructed to the instant invention having three hulls (i.e., a tri-hull floating wing)
Figure 17:
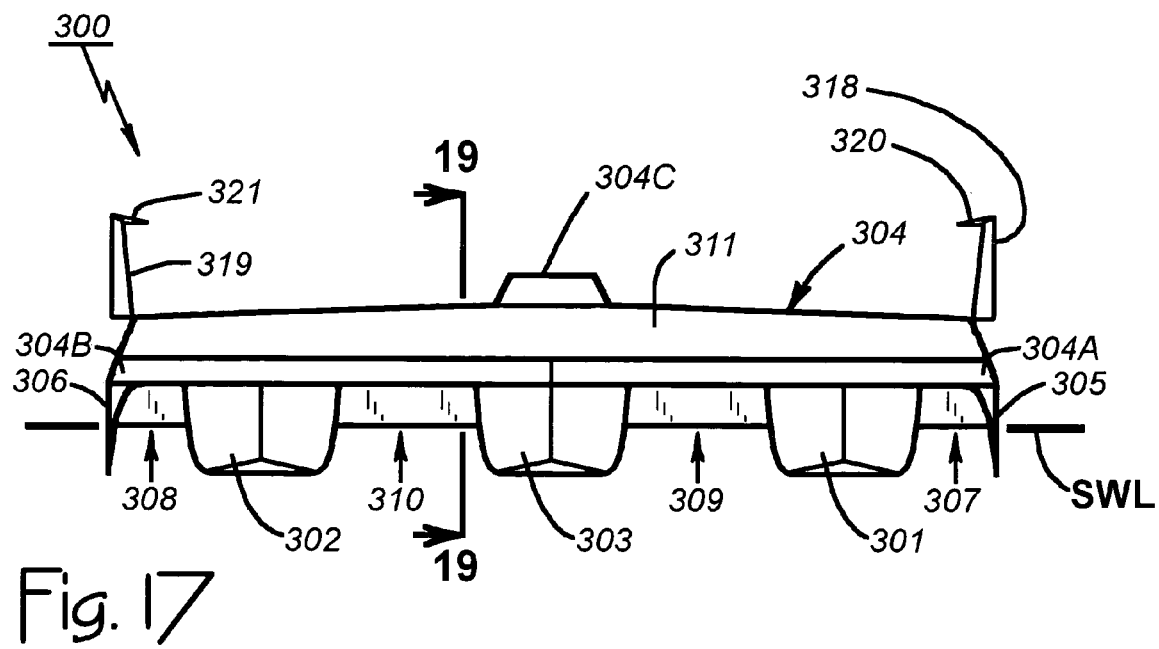
FIG. 17 is a diagrammatic elevation view of the tri-hull floating wing looking aft toward the bow structure.
Figure 18:
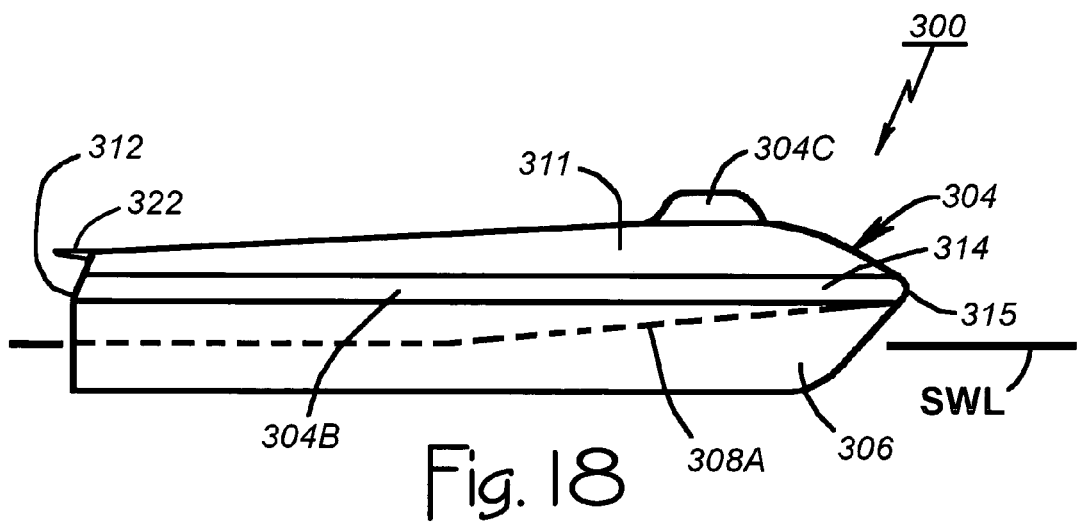
FIG. 18 is a diagrammatic side elevation view of the tri-hull floating wing (i.e., a starboard profile)

Super High Speed Multi-Hull Watercraft. FIGS. 16, 17, 18, and 19 illustrate various aspects of a watercraft embodying super high speed aspects of the instant invention. It takes the form of a tri-hull watercraft 300 having three hulls with fine-entry bows, a first or port hull 301, a second or starboard hull 302, and a third or central hull 303 (FIGS. 16 and 17). A deck structure 304 (a super structure) spans the hulls 301–303, extending laterally beyond the port hull 301 to a port side 304A of the deck structure and laterally beyond the starboard hull 302 to a starboard side 304B of the deck structure 304. A port skirt 305 extends downwardly from the port side 304A to below a static waterline SWL of the watercraft 300 that is identified in FIGS. 17 and 18, and a starboard skirt 306 extends downwardly from the starboard side 304A to below the static waterline SWL.

The port and starboard skirts 305 and 306 and hulls 301–303 combine to form four forwardly opening and rearwardly extending planing channels 307, 308, 309, and 310. The first or port planing channel 307 is disposed intermediate the port skirt 305 and the port hull 301 and the second or starboard planing channel 308 is disposed intermediate the starboard skirt 306 and the starboard hull 302. A starboard planing channel ceiling 308A of the starboard planing channel 308 is shown by a broken line in FIG. 18. The third planing channel 309 is disposed between the port hull and the central hull 303, and the fourth planing channel 310 is disposed between the starboard hull 302 and the central hull 303 (with a fourth planing channel ceiling 310A being identified in FIG. 19). Each of the four planing channels forces aerated bow waves into after air cushions at a respective one of regions W, X, Y, and Z of the planing channels (FIG. 16). Construction is similar in some respects to the watercraft 200 described above, but the watercraft 300 need have no inboard skirts similar to the inboard skirts 211 and 219 of the watercraft 200.

Figure 19:
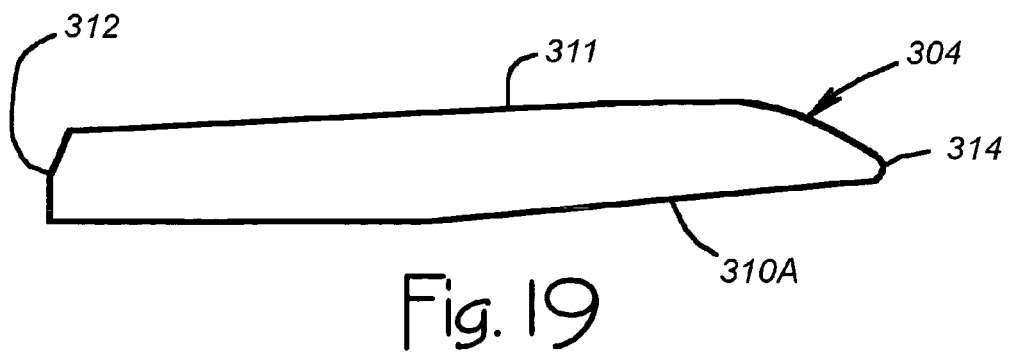
FIG. 19 is a diagrammatic profile of the airfoil-like shape of the tri-hull floating wing deck structure as viewed in a vertical plane containing a line 19—19 in FIG. 17.

Unlike the watercraft 200 and other existing multi-hull watercraft, the deck structure 304 of the watercraft 300 is wing-like in that it includes an upwardly facing surface 311 (FIGS. 17, 18, and 19) that slopes downwardly toward an aft end 312 of the deck structure 304 in order to produce aerodynamic lift from air passing over the deck structure. The wing-like surface 311 of the deck structure 304 functions in a manner similar to that of an aircraft wing or other airfoil, and it includes a pilot house 304C on the forward deck that is molded in to the cambered wing-like deck structure 304. FIG. 19 shows a profile of the deck structure 304. It is a wing-like structure and it may include port and starboard leading edges 313 and 314 (FIG. 16) that slope back from the watercraft bow 315 at the watercraft centerline 316 some thirty degrees or so as indicated by a double-headed arrow 317 in FIG. 16.

Preferably, the deck structure 304 includes means for reducing vessel breadth during docking, including hinged port and starboard deck extensions 318 and 319 (FIGS. 16 and 17) that an operator can selectively raise and lower. The deck extension 318 and 319 are shown deployed for high speed operation in FIG. 16 and raised for docking in FIG. 17; they are omitted from FIG. 18 for illustrative purposes. In addition, the deck structure 304 preferably includes means for reducing the escape of wind laterally over the deck structure, including upwardly extending port and starboard barriers 320 and 321 on respective ones of the port and starboard sides of the deck structure 304, as shown in FIG. 17. Preferably, the deck structure 304 also includes means for enabling an operator to adjust vessel trim, including hinged flap structures disposed rearwardly on the deck structure as indicated by a hinged flap structure 322 in FIG. 18.

Beyond the foregoing aspects, the hulls 301, 302, and 303 of the illustrated watercraft 300 include planing surfaces and vertical steps in the planing surfaces in order to reduce friction drag. The hulls are generally similar in that respect and so only a planing surface 323 and first and second steps 324 and 325 for the port hull 301 are identified in FIG. 16 in order to avoid cluttering that figure with reference numerals. The watercraft 300 may include means for venting exhaust from the onboard propulsion engine at the vertical step while under way in order to introduce gas along the planing surface as described earlier.

Details of the step planing surface and exhaust venting alternatives are discussed earlier in this specification with reference to the other powered watercraft herein described. Thus, the means for venting exhaust may include means for venting a first proportion of the exhaust at the vertical step in the planing surface, including a first exhaust conduit that defines a first exhaust flow path leading to the vertical step in the planing surface, and means for venting a second proportion of the exhaust to atmosphere, including a second exhaust conduit that defines a second exhaust flow path leading to atmosphere. The onboard propulsion engine 326 (FIG. 16) drives a generator 327 that provides electric power to two electric motors 328A and 328B and two banks of batteries 329A and 329B. The engine 326 (a gas turbine or jet engine) has high volume, high velocity, and high temperature exhaust, and (according to another aspect of the invention) the means for venting exhaust includes a speed-responsive exhaust proportioning system that functions without valving to allow vacuum generated at the vertical step in the planing surface to draw in exhaust increasingly with increasing vessel speed in order to generate lift, reduce drag, and reduce thermal signature from exhaust entering the atmosphere.

Thus, the invention provides a super high speed multi-hull watercraft, referred to as a "Floating Wing.," It maximizes the dynamic lift from incoming wind that increases in velocity and volume with increased vessel speed. Although exemplary embodiments are shown and described, one of ordinary skill in the art may make many changes, modifications and substitutions without necessarily departing from the spirit and scope of the invention.

What is claimed is:

1. A watercraft with at least one onboard propulsion engine, comprising:
  at least two hulls in spaced-apart parallel relationship to each other, including a port hull and a starboard hull;
  a deck structure spanning the port and starboard hulls, said deck structure extending laterally beyond the port hull to a port side of the deck structure and laterally beyond the starboard hull to a starboard side of the deck structure;

a port skirt extending vertically downward from the port side of the deck structure that combines with the port hull and the deck structure to form a forwardly opening and rearwardly extending port planing channel;

a starboard skirt extending vertically downward from the starboard side of the deck structure that combines with the starboard hull and the deck structure to form a forwardly opening and rearwardly extending starboard planing channel; and means for providing aerodynamic lift from air passing over the deck structure, including an upwardly facing surface of the deck structure that slopes downwardly toward an aft end of the deck structure in order to produce aerodynamic lift;

wherein at least one of the hulls includes a planing surface and at least one vertical step in the planing surface in order to reduce friction drag.

2. A watercraft as recited in claim 1, further comprising a central hull intermediate the port and starboard hulls that combines with the deck structure and the port and starboard hulls to form two additional planing channels.

3. A watercraft as recited in claim 1, further comprising means for venting exhaust from the onboard propulsion engine at the vertical step while under way in order to introduce gas along the planing surface.

4. A watercraft as recited in claim 3, wherein:

said means for venting exhaust including means for venting a first proportion of the exhaust at the vertical step in the planing surface, including a first exhaust conduit that defines a first exhaust flow path leading to the vertical step in the planing surface; and said means for venting exhaust including means for venting a second proportion of the exhaust to atmosphere, including a second exhaust conduit that defines a second exhaust flow path leading to atmosphere.

5. A watercraft as recited in claim 4, wherein:

the propulsion engine is an engine having high volume, high velocity, and high temperature exhaust similar to that produced by gas turbines and jet engines; and said means for venting exhaust includes a speed-responsive exhaust proportioning system that allows vacuum generated at the vertical step in the planing surface to draw in exhaust increasingly with increasing vessel speed in order to generate lift, reduce drag, and reduce thermal signature from exhaust entering the atmosphere.

6. A watercraft as recited in claim 1, wherein the deck structure includes means for reducing the escape of wind laterally over the deck structure, including upwardly extending barriers on the port and starboard sides of the deck structure.

7. A watercraft with at least one onboard propulsion engine, comprising:

at least two hulls in spaced-apart parallel relationship to each other, including a port hull and a starboard hull;

a deck structure spanning the port and starboard hulls, said deck structure extending laterally beyond the port hull to a port side of the deck structure and laterally beyond the starboard hull to a starboard side of the deck structure;

a port skirt extending vertically downward from the port side of the deck structure that combines with the port hull and the deck structure to form a forwardly opening and rearwardly extending port planing channel;

a starboard skirt extending vertically downward from the starboard side of the deck structure that combines with the starboard hull and the deck structure to form a forwardly opening and rearwardly extending starboard planing channel; and means for providing aerodynamic lift from air passing over the deck structure, including an upwardly facing surface of the deck structure that slopes downwardly toward an aft end of the deck structure in order to produce aerodynamic lift;

wherein the deck structure includes means for reducing vessel breadth during docking, including hinged port and starboard deck extensions that an operator can selectively raise and lower.

8. A watercraft with at least one onboard propulsion engine, comprising:

at least two hulls in spaced-apart parallel relationship to each other, including a port hull and a starboard hull;

a deck structure spanning the port and starboard hulls, said deck structure extending laterally beyond the port hull to a port side of the deck structure and laterally beyond the starboard hull to a starboard side of the deck structure;

a port skirt extending vertically downward from the port side of the deck structure that combines with the port hull and the deck structure to form a forwardly opening and rearwardly extending port planing channel;

a starboard skirt extending vertically downward from the starboard side of the deck structure that combines with the starboard hull and the deck structure to form a forwardly opening and rearwardly extending starboard planing channel; and means for providing aerodynamic lift from air passing over the deck structure, including an upwardly facing surface of the deck structure that slopes downwardly toward an aft end of the deck structure in order to produce aerodynamic lift;

wherein the deck structure includes means for enabling an operator to adjust vessel trim, including hinged flap structures disposed rearwardly on the deck structure.

9. A watercraft with at least one onboard propulsion engine, comprising:

three hulls in spaced-apart, parallel relationship to each other, including a port hull, a starboard hull, and a central hull intermediate the port and starboard hulls;

a deck structure spanning the three hulls, said deck structure extending laterally beyond the port hull to a port side of the deck structure and laterally beyond the starboard hull to a starboard side of the deck structure;

a port skirt extending vertically downward from the port side of the deck structure; and a starboard skirt extending vertically downward from the starboard side of the deck structure;

wherein the three hulls, the port skirt, the starboard skirt, and the deck structure form four forwardly opening and rearwardly extending planing channels; and wherein the deck structure includes an upwardly facing surface that slopes downwardly toward an aft end of the deck structure in order to produce aerodynamic lift;

said watercraft further comprising at least one planing surface on each of the three hulls and at least one vertical step in each of the planing surfaces; and said watercraft further comprising means for venting exhaust from the onboard propulsion engine at the vertical steps, including a speed-responsive exhaust proportioning system that allows vacuum generated at the vertical step in the planing surface to draw in exhaust increasingly with increasing vessel speed.

10. A watercraft as recited in claim 9, wherein the deck structure includes means for reducing the escape of wind laterally over the deck structure, including upwardly extending barriers on the port and starboard sides of the deck structure.

11. A watercraft with at least one onboard propulsion engine, comprising:
- three hulls in spaced-apart, parallel relationship to each other, including a port hull, a starboard hull, and a central hull intermediate the port and starboard hulls;
- a deck structure spanning the three hulls, said deck structure extending laterally beyond the port hull to a port side of the deck structure and laterally beyond the starboard hull to a starboard side of the deck structure;
- a port skirt extending vertically downward from the port side of the deck structure; and
- a starboard skirt extending vertically downward from the starboard side of the deck structure;
- wherein the three hulls, the port skirt, the starboard skirt, and the deck structure form four forwardly opening and rearwardly extending planing channels;
- wherein the deck structure includes an upwardly facing surface that slopes downwardly toward an aft end of the deck structure in order to produce aerodynamic lift; and
- wherein the deck structure includes means for reducing vessel breadth during docking, including hinged port and starboard deck extensions that an operator can selectively raise and lower.

12. A watercraft with at least one onboard propulsion engine, comprising:
- three hulls in spaced-apart, parallel relationship to each other, including a port hull, a starboard hull, and a central hull intermediate the port and starboard hulls;
- a deck structure spanning the three hulls, said deck structure extending laterally beyond the port hull to a port side of the deck structure and laterally beyond the starboard hull to a starboard side of the deck structure;
- a port skirt extending vertically downward from the port side of the deck structure; and
- a starboard skirt extending vertically downward from the starboard side of the deck structure;
- wherein the three hulls, the port skirt, the starboard skirt, and the deck structure forming four forwardly opening and rearwardly extending planing channels;
- wherein the deck structure includes an upwardly facing surface that slopes downwardly toward an aft end of the deck structure in order to produce aerodynamic lift; and
- wherein the deck structure includes means for enabling an operator to adjust vessel trim, including hinged flap structures disposed rearwardly on the deck structure.

* * * * *